(12) United States Patent
Okuma

(10) Patent No.: US 12,703,049 B2
(45) Date of Patent: Aug. 11, 2026

(54) REPAIR WELDING DEVICE AND REPAIR WELDING METHOD

(71) Applicant: Panasonic Intellectual Property Management Co., Ltd., Osaka (JP)

(72) Inventor: Katsuaki Okuma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1057 days.

(21) Appl. No.: 17/832,862

(22) Filed: Jun. 6, 2022

(65) Prior Publication Data

US 2022/0297241 A1 Sep. 22, 2022

Related U.S. Application Data

(63) Continuation of application No. PCT/JP2020/039990, filed on Oct. 23, 2020.

(30) Foreign Application Priority Data

Dec. 6, 2019 (JP) ................................ 2019-221598

(51) Int. Cl.
*B23K 31/02* (2006.01)
*B23K 9/12* (2006.01)
(Continued)

(52) U.S. Cl.
CPC ................ *B23K 31/02* (2013.01); *B23K 9/12* (2013.01); *B23K 31/125* (2013.01); *B25J 11/005* (2013.01); *G05B 17/02* (2013.01)

(58) Field of Classification Search
CPC ........ B23K 31/02; B23K 9/12; B23K 31/125; B23K 9/0956; B23K 9/0953; B23K 26/21;
(Continued)

(56) References Cited

U.S. PATENT DOCUMENTS 6,701,615 B2 * 3/2004 Harding ................ F01D 21/003 29/702
10,682,729 B2 * 6/2020 Witney .................. B25J 19/021
(Continued)

FOREIGN PATENT DOCUMENTS

CN 106990111 7/2017
CN 109664008 4/2019
(Continued)

OTHER PUBLICATIONS

Extended European Search Report issued May 4, 2023 in corresponding European Patent Application No. 20897242.2.
(Continued)

*Primary Examiner* — Brian W Jennison

(74) *Attorney, Agent, or Firm* — Wenderoth, Lind & Ponack, L.L.P.

(57) ABSTRACT

A repair welding device includes an acquisition unit configured to acquire an appearance inspection result including information about a position of a defective portion of a weld bead of a welded workpiece produced by a main welding that is executed by a welding robot, and a robot control unit configured to set a plurality of interpolation points on a virtual welding line of the main welding executed by the welding robot and instruct the welding robot to execute a repair welding on an interpolation point that is closest to the acquired position of the defective portion. The virtual welding line is simulated based on a main welding program for executing the main welding.

7 Claims, 10 Drawing Sheets

(51) Int. Cl.

| | |
|---|---|
| ***B23K 31/12*** | (2006.01) |
| ***B25J 11/00*** | (2006.01) |
| ***G05B 17/02*** | (2006.01) |

(58) Field of Classification Search
CPC ... B25J 11/005; G05B 17/02; G01N 21/8851; G01N 2021/8887
See application file for complete search history.

(56) References Cited

U.S. PATENT DOCUMENTS

| | | | | |
|---|---|---|---|---|
| 10,906,116 | B2 * | 2/2021 | Kita | B23K 9/173 |
| 2006/0006156 | A1 * | 1/2006 | Huonker | B23K 26/244<br>219/121.64 |
| 2006/0213888 | A1 * | 9/2006 | Suzuki | B23K 9/095<br>219/130.01 |
| 2015/0273604 | A1 * | 10/2015 | Anderson | B23K 31/02<br>228/9 |
| 2017/0151634 | A1 * | 6/2017 | Witney | G01N 29/04 |
| 2018/0250763 | A1 * | 9/2018 | Kita | B23K 9/1006 |
| 2020/0276674 | A1 * | 9/2020 | Lee | B23K 31/125 |

FOREIGN PATENT DOCUMENTS

| | | |
|---|---|---|
| CN | 110530877 | 12/2019 |
| JP | 7-132372 | 5/1995 |
| JP | 2000-167666 | 6/2000 |
| JP | 2005-063701 | 3/2005 |
| JP | 2006-247663 | 9/2006 |
| JP | 2007-185666 | 7/2007 |
| JP | 2010-253538 | 11/2010 |
| JP | 2012-37487 | 2/2012 |
| WO | 2019/078375 | 4/2019 |
| WO | 2019/103772 | 5/2019 |

OTHER PUBLICATIONS

Office Action issued Aug. 27, 2024 in corresponding Indian Patent Application No. 202247032255.

International Search Report issued Jan. 19, 2021 in corresponding International Application No. PCT/JP2020/039990.

Communication pursuant to Article 94(3) EPC issued Jul. 28, 2025 in corresponding European Patent Application No. 20897242.2.

Mykhaylo Nykolaychuk et al., "Coverage Path Re-planning for Processing Faults", Aug. 20, 2015, Advances in Visual Computing: 16$^{th}$ International Symposium, ISVC 2021, Virtual Event, Oct. 4-6, 2021, Proceedings, Part II; [Lecture Notes in Computer Science], Springer International Publishing, CHAM., pp. 358-368.

* cited by examiner

FIG. 5A

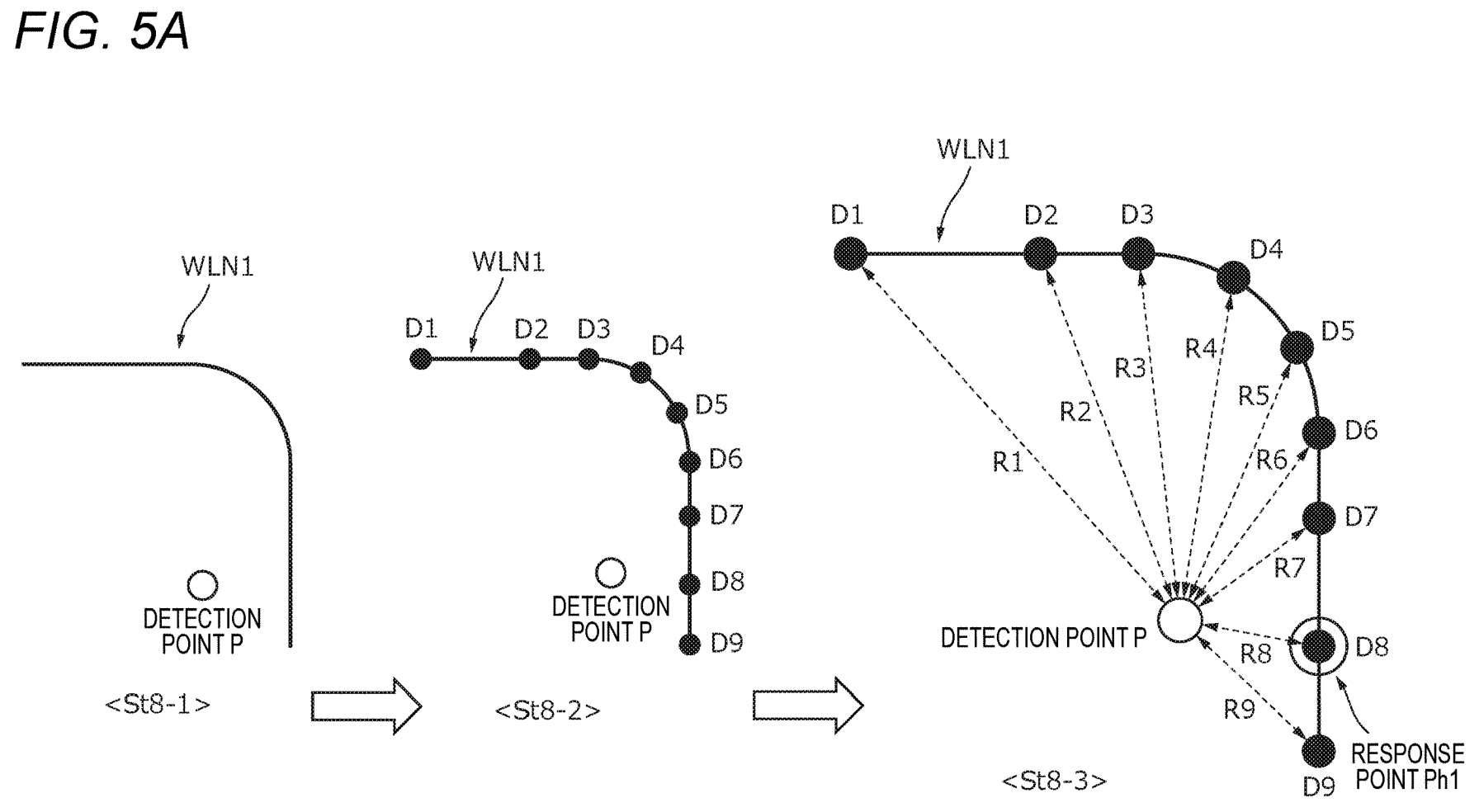

WLN1
DETECTION POINT P
<St8-1>

WLN1
D1
D2
D3
D4
D5
D6
D7
D8
D9
DETECTION POINT P
<St8-2>

WLN1
D1
D2
D3
D4
D5
D6
D7
D8
D9
R1
R2
R3
R4
R5
R6
R7
R8
R9
DETECTION POINT P
RESPONSE POINT Ph1
<St8-3>

DETECTION POINT V
WLN21
WLN2
WLN22
WLN23
<St8-1>
D10
D11
D12
D13
D14
D15
D16
<St8-2>
RESPONSE POINT Ph2
R10
R11
R12
R13
R14
R15
R16
<St8-3>

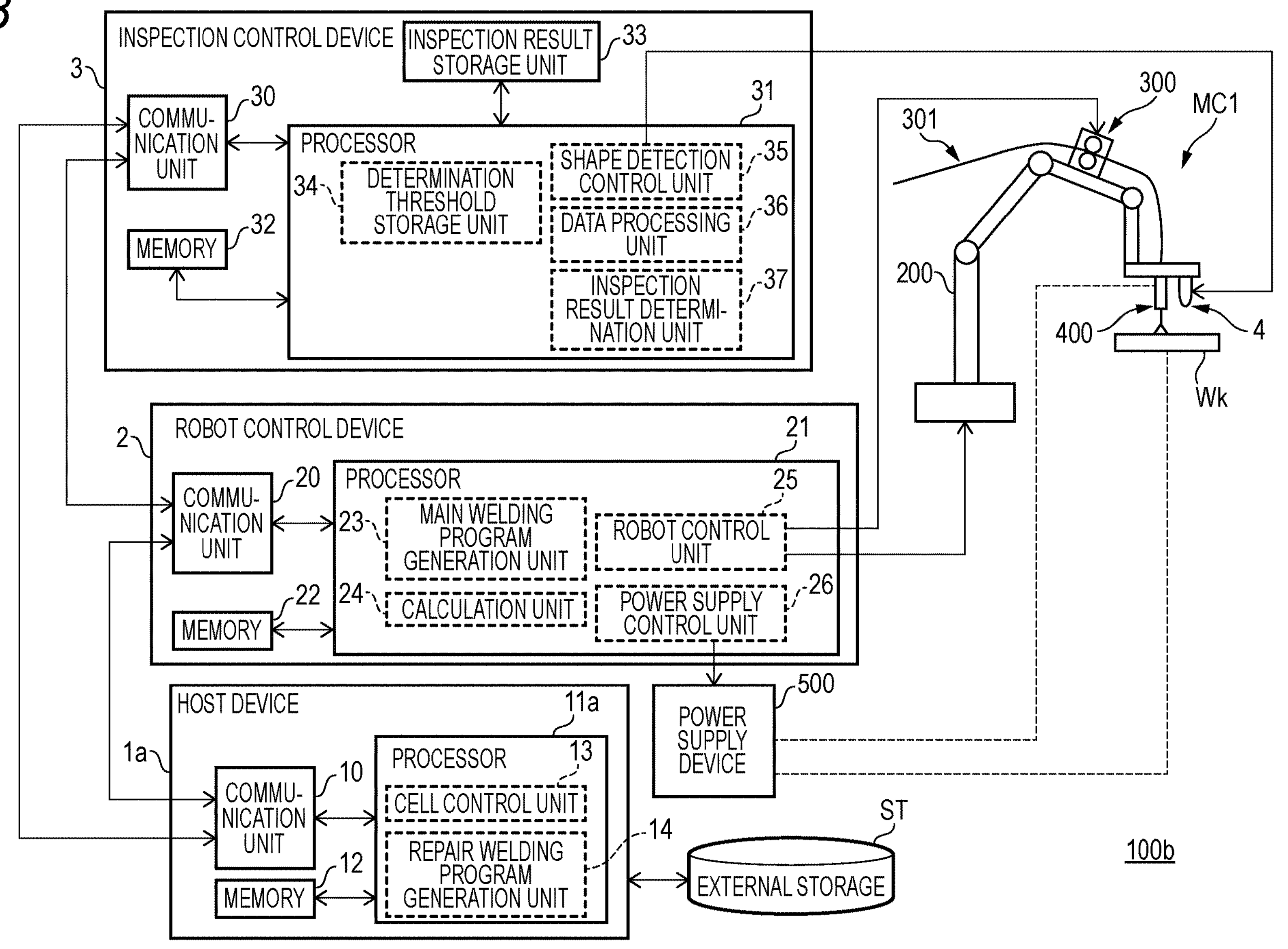
FIG. 8
INSPECTION CONTROL DEVICE
INSPECTION RESULT STORAGE UNIT
33
3
COMMUNICATION UNIT
30
PROCESSOR
31
SHAPE DETECTION CONTROL UNIT
35
DETERMINATION THRESHOLD STORAGE UNIT
34
DATA PROCESSING UNIT
36
MEMORY
32
INSPECTION RESULT DETERMINATION UNIT
37
ROBOT CONTROL DEVICE
2
21
COMMUNICATION UNIT
20
PROCESSOR
MAIN WELDING PROGRAM GENERATION UNIT
23
ROBOT CONTROL UNIT
25
MEMORY
22
CALCULATION UNIT
24
POWER SUPPLY CONTROL UNIT
26
HOST DEVICE
11a
1a
PROCESSOR
13
COMMUNICATION UNIT
10
CELL CONTROL UNIT
REPAIR WELDING PROGRAM GENERATION UNIT
14
MEMORY
12
POWER SUPPLY DEVICE
500
EXTERNAL STORAGE
ST
301
300
MC1
200
400
4
Wk
100b

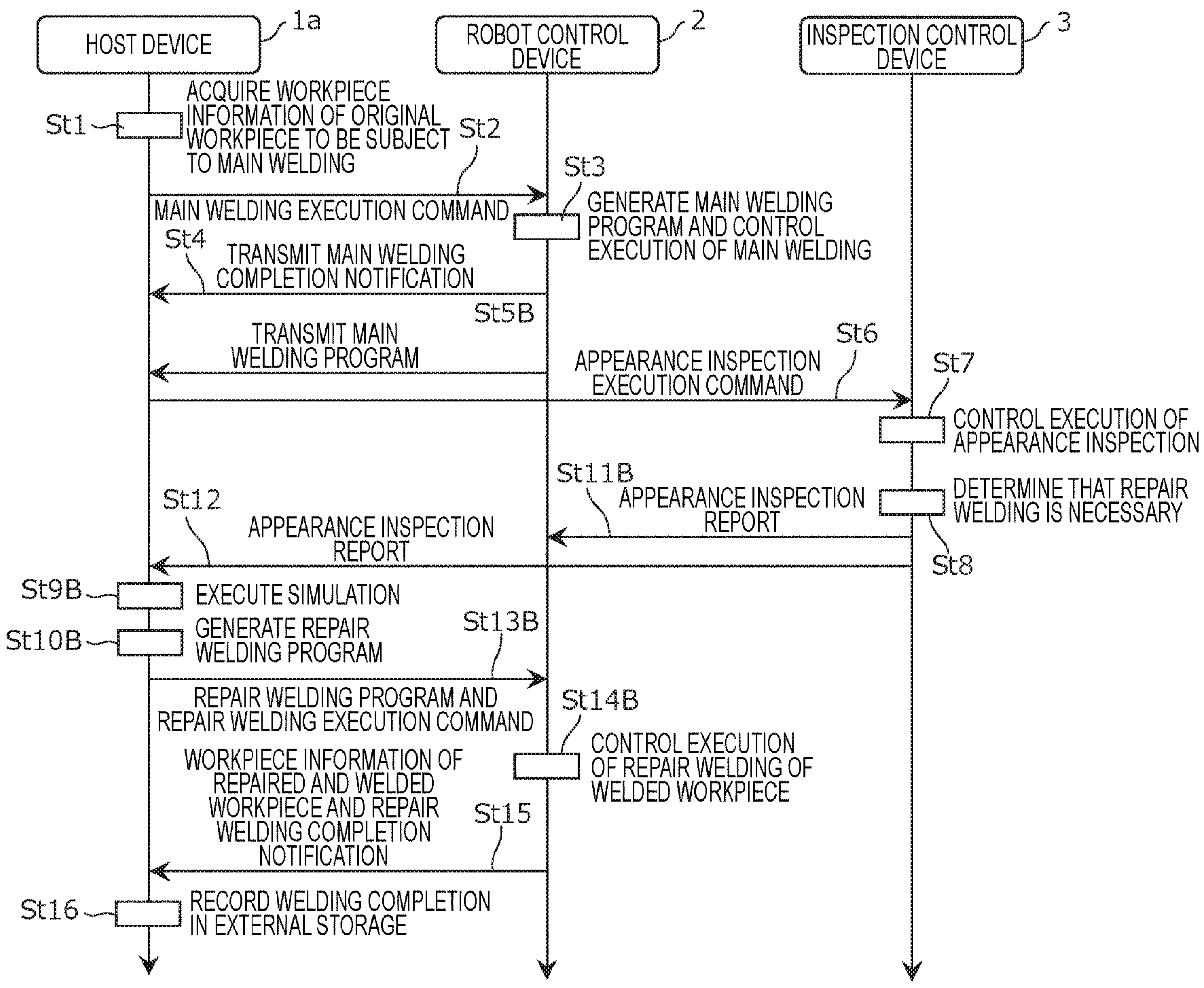

FIG. 9
HOST DEVICE
1a
ROBOT CONTROL DEVICE
2
INSPECTION CONTROL DEVICE
3
St1
ACQUIRE WORKPIECE INFORMATION OF ORIGINAL WORKPIECE TO BE SUBJECT TO MAIN WELDING
St2
MAIN WELDING EXECUTION COMMAND
St3
GENERATE MAIN WELDING PROGRAM AND CONTROL EXECUTION OF MAIN WELDING
St4
TRANSMIT MAIN WELDING COMPLETION NOTIFICATION
St5B
TRANSMIT MAIN WELDING PROGRAM
St6
APPEARANCE INSPECTION EXECUTION COMMAND
St7
CONTROL EXECUTION OF APPEARANCE INSPECTION
St11B
APPEARANCE INSPECTION REPORT
DETERMINE THAT REPAIR WELDING IS NECESSARY
St8
St12
APPEARANCE INSPECTION REPORT
St9B
EXECUTE SIMULATION
St10B
GENERATE REPAIR WELDING PROGRAM
St13B
REPAIR WELDING PROGRAM AND REPAIR WELDING EXECUTION COMMAND
St14B
CONTROL EXECUTION OF REPAIR WELDING OF WELDED WORKPIECE
WORKPIECE INFORMATION OF REPAIRED AND WELDED WORKPIECE AND REPAIR WELDING COMPLETION NOTIFICATION
St15
St16
RECORD WELDING COMPLETION IN EXTERNAL STORAGE

REPAIR WELDING DEVICE AND REPAIR WELDING METHOD

CROSS-REFERENCE TO RELATED APPLICATIONS

This is a continuation of International Application No. PCT/JP2020/039990 filed on Oct. 23, 2020, and claims priority from Japanese Patent Application No. 2019-221598 filed on Dec. 6, 2019, the entire content of which is incorporated herein by reference.

TECHNICAL FIELD

The present disclosure relates to a repair welding device and a repair welding method.

BACKGROUND ART

JP-A-2012-37487 discloses a shape inspection device that projects slit light onto a weld bead, images shape lines sequentially formed on the weld bead by scanning the weld bead with the slit light, and acquires a three-dimensional shape of the weld bead as point cloud data based on imaging data of the sequentially formed shape lines. The shape inspection device sets a cutting line different from the shape lines formed by scanning the weld bead with the slit light to the weld bead displayed based on the point cloud data in accordance with an input, and calculates a cross-sectional shape of the weld bead at the cutting line based on the point cloud data corresponding to the cutting line. The shape inspection device compares various feature amounts calculated according to the cross-sectional shape with allowable ranges of the various feature amounts registered in advance, and determines whether the feature amounts are good or poor.

SUMMARY OF INVENTION

The present disclosure provides a repair welding device and a repair welding method for more efficiently and automatically executing a repair welding on a defective portion of a welded workpiece produced by a main welding.

Aspect of non-limiting embodiments of the present disclosure relates to a repair welding device including an acquisition unit configured to acquire an appearance inspection result including information about a position of a defective portion of a weld bead of a welded workpiece produced by a main welding that is executed by a welding robot, and a robot control unit configured to set a plurality of interpolation points on a virtual welding line of the main welding executed by the welding robot, and instruct the welding robot to execute a repair welding on an interpolation point that is closest to the acquired position of the defective portion, the virtual welding line being simulated based on a main welding program for executing the main welding.

Aspect of non-limiting embodiments of the present disclosure relates to a repair welding method to be executed by a repair welding device. The repair welding method includes a process of acquiring an appearance inspection result including information about a position of a defective portion of a weld bead of a welded workpiece produced by a main welding that is executed by a welding robot, a process of setting a plurality of interpolation points on a virtual welding line of the main welding executed by the welding robot, the virtual welding line being simulated based on a main welding program for executing the main welding, and a process of instructing the welding robot to execute a repair welding on an interpolation point that is closest to the acquired position of the defective portion.

According to the present disclosure, a defective portion of a welded workpiece produced by a main welding can be more efficiently and automatically repaired and welded.

BRIEF DESCRIPTION OF DRAWINGS

FIG. 5A is a diagram schematically showing an operation outline example related to specification of a response point that is located on a virtual welding line and is closest to a detection point.

FIG. 8 is a diagram showing an internal configuration example of an inspection control device, a robot control device, and a host device according to a third embodiment.

FIG. 9 is a sequence diagram showing an example of an operation procedure of a main welding and a repair welding that are executed by a welding system according to the third embodiment.

DESCRIPTION OF EMBODIMENTS

Background of Present Disclosure

Figure 1:
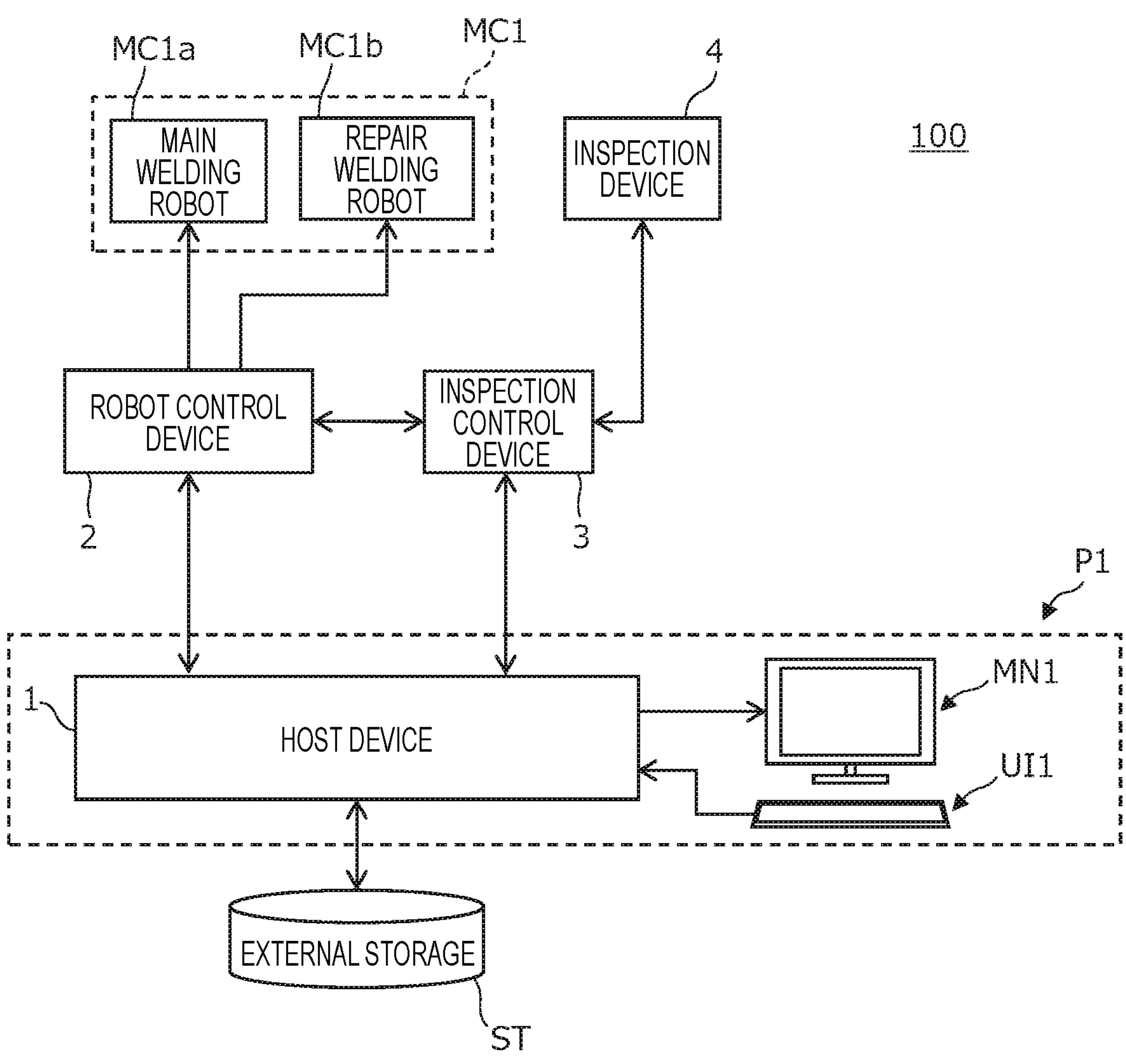
FIG. 1 is a schematic diagram showing a system configuration example of a welding system.

The related art including JP-A-2012-37487 does not disclose a technique in which a welding robot or the like automatically executes a repair welding in order to correct (repair) a portion where a welding defect (that is, a defect) occurs based on an appearance inspection result of a workpiece (hereinafter, referred to as a "welded workpiece") produced by a main welding. In order to automatically execute a repair welding by the welding robot, it is required to prepare in advance a program for the repair welding in which a portion where the repair welding is to be executed is specified in a similar manner to the main welding. In order to prevent interference between a tip end portion of the welding robot and the welded workpiece or a jig for fixing the welded workpiece while actually executing a repair welding on a welding defective portion, it is preferable to generate a repair welding program by partially changing a main welding program that is generated to produce the welded workpiece. In other words, an operation of the welding robot during the repair welding can be stabilized by skillfully using an operation trajectory of the welding robot during the main welding.

In an appearance inspection of the welded workpiece, information (for example, coordinates) related to a position of a welding defective portion (hereinafter, simply referred to as a "defective portion") is detected by an inspection device such as a camera or a sensor that projects laser light, and the information is output as defective portion information. Therefore, in order to generate the repair welding program described above, it is required to specifically specify which welding section of the main welding program corresponds to the defective portion. However, for example, when a weld bead formed by the main welding is thick or when there is a slight error in positional accuracy of the defective portion output from the inspection device, the defective portion information detected by the inspection device may not necessarily be positioned on the operation trajectory of the welding robot defined in the main welding program. For this reason, when the welding robot automatically performs the repair welding, there is a problem in that the accuracy of the position to be repaired by the repair welding is reduced and the efficiency of the repair welding is not improved.

An example of a repair welding device and a repair welding method for more efficiently and automatically executing a repair welding on a defective portion of a welded workpiece produced by a main welding will be described in the following embodiments.

Hereinafter, embodiments specifically disclosing a repair welding device and a repair welding method according to the present disclosure will be described in detail with reference to the drawings as appropriate. Unnecessarily detailed description may be omitted. For example, detailed description of a well-known matter or repeated description of substantially the same configuration may be omitted. This is to avoid unnecessary redundancy in the following description and to facilitate understanding of those skilled in the art. It should be noted that the accompanying drawings and the following description are provided to enable those skilled in the art to fully understand the present disclosure, and are not intended to limit the range of the claims.

First Embodiment

The repair welding device according to the first embodiment acquires an appearance inspection result including information about a defective portion of a weld bead of a welded workpiece produced by a main welding by a welding robot, and based on the appearance inspection result, the repair welding device instructs the welding robot to execute a repair welding on a corresponding portion that is located on an operation trajectory of the welding robot during the main welding and is closest to a position of the defective portion. Hereinafter, a workpiece to be welded by a main welding is defined as an "original workpiece", a workpiece produced (manufactured) by the main welding is defined as a "welded workpiece", and a workpiece of which a detected welding defective portion of the "welded workpiece" is repaired and welded is defined as a "repaired and welded workpiece". A process of producing a welded workpiece by joining an original workpiece and another original workpiece by a welding robot or the like is defined as a "main welding", and a process of correcting (repairing) a defective portion of the welded workpiece by a welding robot or the like is defined as a "repair welding". The "welded workpiece" or the "repaired and welded workpiece" is not limited to a workpiece produced by the main welding executed once, and may be a composite workpiece produced the main welding executed two or more times.

(Configuration of Welding System)

FIG. 1 is a schematic diagram showing a system configuration example of a welding system 100. The welding system 100 includes a host device 1 connected to an external storage ST, an input interface UI1, a monitor MN1, a robot control device 2, an inspection control device 3, a main welding robot MC1*a*, and a repair welding robot MC1*b*. The main welding robot MC1*a* and the repair welding robot MC1*b* may be configured as separate robots, or may be configured as the same welding robot MC1. In order to make the following description easy to understand, it is assumed that both a main welding and a repair welding are executed by the welding robot MC1. Although only one pair of the robot control device 2 and the main welding robot MC1*a*, the repair welding robot MC1*b* is shown in FIG. 1, a plurality of such pairs may be provided. The welding system 100 may further include an inspection device 4.

The host device 1 serving as an example of a repair welding device integrally controls, via the robot control device 2, the execution of a main welding (for example, start and completion of the main welding) executed by the welding robot MC1. For example, the host device 1 reads out welding related information input or set in advance by a user (for example, a welding operator or a system administrator. The same applies hereinafter.) from the external storage ST, generates a main welding execution command including contents of the welding related information by using the welding related information, and transmits the main welding execution command to the corresponding robot control device 2. When the main welding executed by the welding robot MC1 is completed, the host device 1 receives a main welding completion report indicating that the main welding executed by the welding robot MC1 is completed from the robot control device 2, updates a status of a corresponding welded workpiece to a status indicating that the main welding is completed, and records the status in the external storage ST. The main welding execution command described above is not limited to being generated by the host device 1, and may be generated by, for example, an operation panel (for example, a programmable logic controller (PLC)) of equipment in a factory or the like where the main welding is executed, or an operation panel (for example, a teach pendant (TP)) of the robot control device 2. The teach pendant (TP) is a device for operating the main welding robot MC1*a*, the repair welding robot MC1*b*, and the like that are connected to the robot control device 2.

The host device 1 integrally controls, via the inspection control device 3, the execution of an appearance inspection (for example, start and completion of the appearance inspection) executed by the inspection device 4. For example, when the host device 1 receives the main welding completion report from the robot control device 2, the host device 1 generates an appearance inspection execution command for a welded workpiece produced by the welding robot MC1, and transmits the appearance inspection execution command to the inspection control device 3. When the appearance inspection executed by the inspection device 4 is completed, the host device 1 receives an appearance inspection report indicating that the appearance inspection executed by the inspection device 4 is completed from the inspection control device 3, updates the status of a corresponding welded workpiece to a status indicating that the appearance inspection is completed, and records the status in the external storage ST.

The host device 1 integrally controls, via the robot control device 2, the execution of a repair welding (for example, start and completion of the repair welding) executed by the welding robot MC1. For example, when the host device 1 receives the appearance inspection report from the inspection control device 3, the host device 1 generates a repair welding execution command for the welded workpiece produced by the welding robot MC1, and transmits the repair welding execution command to the robot control device 2. When a repair welding executed by the welding robot MC1 is completed, the host device 1 receives a repair welding completion report indicating that the repair welding executed by the welding robot MC1 is completed from the robot control device 2, updates the status of a corresponding welded workpiece to a status indicating that the repair welding is completed, and records the status in the external storage ST.

Here, the welding related information is information indicating contents of the main welding executed by the welding robot MC1. The welding related information is generated in advance for each process of the main welding and is registered in the external storage ST. The welding related information includes, for example, the number of original workpieces used in the main welding, workpiece information including an ID, a name, and a welded portion of an original workpiece used in the main welding, a scheduled execution date on which the main welding is executed, the number of welded workpieces to be produced, and various welding conditions during the main welding. The welding related information is not limited to data of items described above. Based on an execution command transmitted from the host device 1, the robot control device 2 causes the welding robot MC1 to execute a main welding using a plurality of original workpieces designated by the execution command. A type of the main welding is not limited in the present specification, and a process of joining a plurality of original workpieces will be described as an example in order to make the description easy to understand.

The host device 1 is connected to the monitor MN1, the input interface UI1, and the external storage ST so that the host device 1 can input data into and output data to the monitor MN1, the input interface UI1, and the external storage ST. The host device 1 is further connected to the robot control device 2 so that data can be communicated between the host device 1 and the robot control device 2. The host device 1 may include a terminal device P1 that includes the monitor MN1 and the input interface UI1 in an integrated manner, and may further include the external storage ST in an integrated manner. In this case, the terminal device P1 is a personal computer (PC) that is used by a user before the main welding is executed. The terminal device P1 is not limited to the PC described above, and may be a computer device having a communication function, such as a smartphone and a tablet terminal.

The monitor MN1 may be configured with a display device such as a liquid crystal display (LED) or an organic electroluminescence (EL). The monitor MN1 may display, for example, a screen including a notification indicating that a main welding is completed or a notification indicating that a repair welding is completed, and the notification is output from the host device 1. Instead of the monitor MN1, a speaker (not shown) may be connected to the host device 1, or the monitor MN1 and a speaker (not shown) may be connected to the host device 1. The host device 1 may output, via the speaker, a notification indicating that a main welding is completed or a sound indicating that a repair welding is completed.

The input interface UI1 is a user interface that detects an input operation of a user and outputs the input operation to the host device 1, and may be configured with, for example, a mouse, a keyboard, a touch panel, or the like. The input interface UI1 receives, for example, an input operation when a user generates welding related information or an input operation when a main welding execution command is transmitted to the robot control device 2.

The external storage ST is configured with, for example, a hard disk drive or a solid state drive. The external storage ST stores, for example, data of welding related information generated for each main welding, and workpiece information (see above description) of a welded workpiece produced by a main welding or a repaired and welded workpiece repaired by a repair welding.

The robot control device 2 serving as an example of a repair welding device is connected to the host device 1 so that data can be communicated between the robot control device 2 and the host device 1, and the robot control device 2 is connected to the welding robot MC1 so that data can be communicated between the robot control device 2 and the welding robot MC1. When the robot control device 2 receives the main welding execution command transmitted from the host device 1, the robot control device 2 controls the corresponding welding robot MC1 based on the main welding execution command to execute a main welding. When the robot control device 2 detects that the main welding is completed, the robot control device 2 generates a main welding completion report indicating that the main welding is completed, and notifies the host device 1 of the main welding completion report. Accordingly, the host device 1 can appropriately detect the completion of the main welding based on the report transmitted from the robot control device 2. A method of detecting the completion of a main welding by the robot control device 2 may be, for example, a method of determining the completion of a main welding based on a signal indicating the completion of a main welding from a sensor (not shown) provided in a wire feeding device 300, or may be a known method, and contents of the method of detecting the completion of a main welding is not limited.

When the robot control device 2 receives a repair welding execution command transmitted from the host device 1, the robot control device 2 controls the corresponding welding robot MC1 based on the repair welding execution command to execute a repair welding in accordance with a repair welding program generated by the inspection control device 3. When the robot control device 2 detects that the repair welding is completed, the robot control device 2 generates a repair welding completion report indicating that the repair welding is completed, and notifies the host device 1 of the repair welding completion report. Accordingly, the host device 1 can appropriately detect the completion of the repair welding based on the report transmitted from the robot control device 2. A method of detecting the completion of a repair welding by the robot control device 2 may be, for example, a method of determining the completion of a repair welding based on a signal indicating the completion of a repair welding from a sensor (not shown) provided in the wire feeding device 300, or may be a known method, and contents of the method of detecting the completion of a repair welding is not limited.

The welding robot MC1 serving as an example of a welding robot is connected to the robot control device 2 so that data can be communicated between the welding robot MC1 and the robot control device 2. The welding robot MC1 executes a main welding or a repair welding according to a command from the host device 1 under the control of the corresponding robot control device 2. As described above, the welding robot MC1 may include the main welding robot MC1*a* provided for a main welding and the repair welding robot MC1*b* provided for a repair welding.

The inspection control device 3 serving as an example of a repair welding device is connected to the host device 1, the robot control device 2, and the inspection device 4 so that data can be communicated among the inspection control device 3, the host device 1, the robot control device 2, and the inspection device 4. When the inspection control device 3 receives an appearance inspection execution command transmitted from the host device 1, the inspection control device 3 causes the inspection device 4 to execute an appearance inspection on a welded portion of a welded workpiece produced by the welding robot MC1 (for example, inspects whether a weld bead formed by a main welding conforms to a shape of a predetermined master bead). For example, the inspection control device 3 controls the inspection device 4 to detect a shape of a weld bead formed in a welded portion based on welded portion information of a welded workpiece included in the appearance inspection execution command, and compares a shape of a predetermined weld master bead (not shown) for each main welding with a shape of an actually detected weld bead. The inspection control device 3 generates an appearance inspection report based on the comparison, and transmits the appearance inspection report to the host device 1.

When the inspection control device 3 determines that an appearance inspection result of a welded workpiece is fail, the inspection control device 3 generates a repair welding program for correcting (repairing) a welding defective portion by using the appearance inspection result that indicates position information of a detection point indicating a place where a welding defective portion is detected and that is obtained from the inspection device 4. The inspection control device 3 transmits the repair welding program and the appearance inspection result to the robot control device 2 in association with each other.

The inspection device 4 is connected to the robot control device 2 so that data can be communicated between the inspection device 4 and the robot control device 2. Based on the appearance inspection execution command transmitted from the inspection control device 3, the inspection device 4 determines (executes an appearance inspection) whether there is a welding defect in a welded portion based on the welded portion information included in the appearance inspection execution command, the shape data of the weld bead in the welded portion generated by the inspection device 4 (see FIG. 2), and the shape data of the master bead described above. The inspection device 4 transmits information about a defective portion (for example, a detection point indicating a position of a portion where a welding defect is detected, and a type of a welding defect) that is determined to be a welding defective portion among welded portions to the inspection control device 3 as an appearance inspection report.

Figure 2:
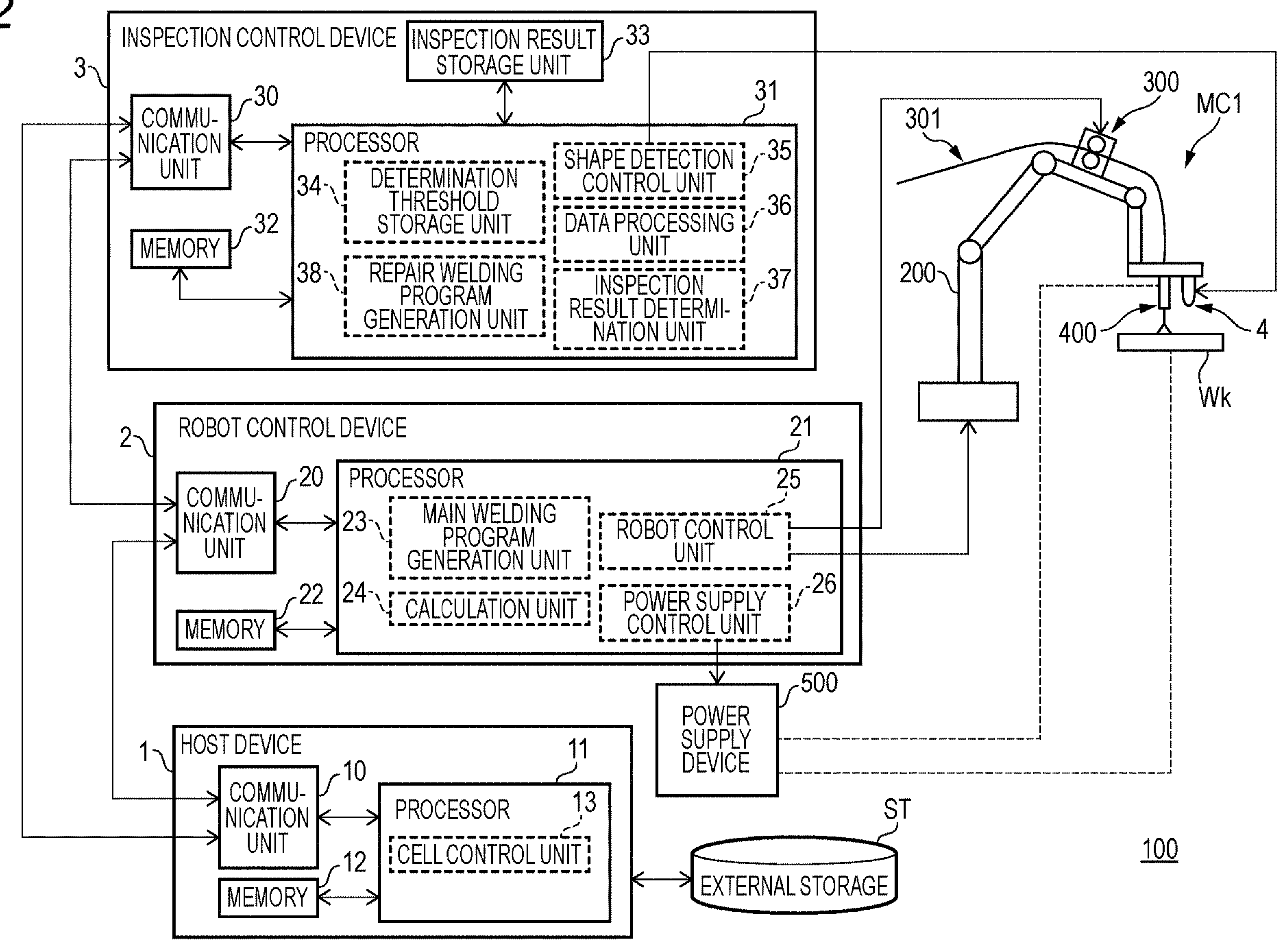
FIG. 2 is a diagram showing an internal configuration example of an inspection control device, a robot control device, and a host device according to a first embodiment.

FIG. 2 is a diagram showing an internal configuration example of the inspection control device 3, the robot control device 2, and the host device 1 according to the first embodiment. The monitor MN1 and the input interface UI1 are not shown in FIG. 2 in order to make the description easy to understand.

The welding robot MC1 executes various processes such as a main welding and a repair welding according to a command from the host device 1 under the control of the robot control device 2. The welding robot MC1 executes, for example, an arc welding in a process of a main welding or a repair welding. Alternatively, the welding robot MC1 may execute a welding (for example, a laser welding or a gas welding) other than the arc welding. In this case, although not shown, a laser head, instead of a welding torch 400, may be connected to a laser oscillator via an optical fiber. The welding robot MC1 includes at least a manipulator 200, the wire feeding device 300, a welding wire 301, and a welding torch 400.

The manipulator 200 includes an articulated arm, and moves each arm based on a control signal from a robot control unit 25 (see following description) of the robot control device 2. Accordingly, the manipulator 200 can change a positional relationship between the workpiece Wk and the welding torch 400 (for example, an angle of the welding torch 400 relative to the workpiece Wk) by a movement of the arm.

The wire feeding device 300 controls a feeding speed of the welding wire 301 based on a control signal (to be described later) from the robot control device 2. The wire feeding device 300 may include a sensor (not shown) that can detect a remaining amount of the welding wire 301. Based on an output of the sensor, the robot control device 2 can detect that a process of a main welding or a repair welding is completed.

The welding wire 301 is held by the welding torch 400. When power is supplied from a power supply device 500 to the welding torch 400, an arc is generated between a tip end of the welding wire 301 and the workpiece Wk, and an arc welding is executed. The illustration and description of a configuration and the like for supplying shielding gas to the welding torch 400 are omitted for the convenience of description.

The host device 1 generates an execution command of various processes of a main welding using a plurality of original workpieces or a repair welding in which a welding defective portion of a welded workpiece is corrected (repaired) by using welding related information input or set in advance by a user, and transmits the execution command to the robot control device 2. The host device 1 includes at least a communication unit 10, a processor 11, and a memory 12.

The communication unit 10 is connected to the robot control device 2 and the external storage ST so that data can be communicated among the communication unit 10, the robot control device 2, and the external storage ST. The communication unit 10 transmits an execution command of various processes of a main welding or a repair welding generated by the processor 11 to the robot control device 2. The communication unit 10 receives a main welding completion report, an appearance inspection report, and a repair welding completion report that are transmitted from the robot control device 2, and outputs the main welding completion report, the appearance inspection report, and the repair welding completion report to the processor 11. A main welding or repair welding execution command may include, for example, a control signal for controlling the manipulator 200, the wire feeding device 300, and the power supply device 500 included in the welding robot MC1.

The processor 11 is configured with, for example, a central processing unit (CPU) or a field programmable gate array (FPGA), and executes various processings and controls in cooperation with the memory 12. Specifically, the processor 11 implements functions of a cell control unit 13 by referring to a program stored in the memory 12 and executing the program.

The memory 12 includes, for example, a random access memory (RAM) serving as a work memory used when a processing of the processor 11 is executed, and a read only memory (ROM) that stores a program for defining a processing of the processor 11. The RAM temporarily stores data generated or acquired by the processor 11. A program that defines a processing of the processor 11 is written into the ROM. The memory 12 stores data of welding related information read from the external storage ST and data of workpiece information (see following description) that is related to a welded workpiece or a repaired and welded workpiece and is transmitted from the robot control device 2.

Based on the welding related information stored in the external storage ST, the cell control unit 13 generates an execution command that is used for executing a main welding using a plurality of original workpieces or executing a repair welding on a welded workpiece and that is defined (in other words, set) in the welding related information. The cell control unit 13 may generate different execution commands for various processes of a main welding or a repair welding to be executed by the welding robot MC1. The main welding or repair welding execution command generated by the cell control unit 13 is transmitted to the corresponding robot control device 2 via the communication unit 10.

The robot control device 2 controls a processing of the corresponding welding robot MC1 (specifically, the manipulator 200, the wire feeding device 300, and the power supply device 500) based on a main welding or repair welding execution command transmitted from the host device 1. The robot control device 2 includes at least a communication unit 20, a processor 21, and a memory 22.

The communication unit 20 is connected to the host device 1, the inspection control device 3, and the welding robot MC1 so that data can be communicated among the communication unit 20, the host device 1, the inspection control device 3, and the welding robot MC1. Although illustration is simplified in FIG. 2, data is transmitted and received between the robot control unit 25 and the manipulator 200, between the robot control unit 25 and the wire feeding device 300, and between a power supply control unit 26 and the power supply device 500 via the communication unit 20. The communication unit 20 receives a main welding execution command or a repair welding execution command transmitted from the host device 1. The communication unit 20 transmits workpiece information of a welded workpiece produced by a main welding or workpiece information of a repaired and welded workpiece produced by a repair welding to the host device 1.

Here, the workpiece information not only includes an ID of a welded workpiece or a repaired and welded workpiece but also includes at least an ID of each of a plurality of original workpieces used in a main welding, a name, a welded portion, a welding condition at the time of executing a main welding, and a welding condition at the time of executing a repair welding. Further, the workpiece information may include information (for example, coordinates) indicating a position of a detection point indicating a defective portion of a welded workpiece. A welding condition or a repair welding condition includes, for example, a material and a thickness of an original workpiece, a material and a wire diameter of the welding wire 301, a type of shielding gas, a flow rate of the shielding gas, a set average value of a welding current, a set average value of a welding voltage, a feeding speed and a feeding amount of the welding wire 301, the number of times of welding, and welding time. In addition, the welding condition or the repair welding condition may include, for example, information indicating a type of a main welding or a repair welding (for example, a TIG welding, a MAG welding, or a pulse welding), and a moving speed and moving time of the manipulator 200.

The processor 21 is configured with, for example, a CPU or an FPGA, and executes various processings and controls in cooperation with the memory 22. Specifically, the processor 21 implements functions of a main welding program generation unit 23, a calculation unit 24, the robot control unit 25, and the power supply control unit 26 by referring to a program stored in the memory 22 and executing the program.

The memory 22 includes, for example, a RAM serving as a work memory used when a processing of the processor 21 is executed, and a ROM that stores a program for defining a processing of the processor 21. The RAM temporarily stores data generated or acquired by the processor 21. A program that defines a processing of the processor 21 is written into the ROM. The memory 22 stores data of a main welding execution command or a repair welding execution command transmitted from the host device 1, and data of workpiece information of a welded workpiece produced by a main welding or a repaired and welded workpiece produced by a repair welding. The memory 22 stores a main welding program to be executed by the welding robot MC1. The main welding program is a program that defines a specific procedure (process) of a main welding in which a plurality of original workpieces are joined using a welding condition of the main welding.

The main welding program generation unit 23 uses workpiece information (for example, an ID, a name, and a welded portion of an original workpiece) of each of a plurality of original workpieces included in a main welding execution command transmitted from the host device 1 via the communication unit 20 to generate a main welding program for a main welding to be executed by the welding robot MC1 based on the main welding execution command. The main welding program may include various parameters such as a welding current, a welding voltage, an offset amount, a welding speed, and a posture of the welding torch 400 for controlling the power supply device 500, the manipulator 200, the wire feeding device 300, the welding torch 400, and the like during the execution of a main welding. The generated main welding program may be stored in the processor 21 or may be stored in the RAM of the memory 22. The generated main welding program is transmitted to the repair welding program generation unit 38 in the inspection control device 3 via the communication unit 20.

The calculation unit 24 executes various calculations. For example, the calculation unit 24 calculates parameters for controlling the welding robot MC1 (specifically, the manipulator 200, the wire feeding device 300, and the power supply device 500) controlled by the robot control unit 25 based on the main welding program generated by the main welding program generation unit 23.

The robot control unit 25 generates a control signal for driving the welding robot MC1 (specifically, the manipulator 200, the wire feeding device 300, and the power supply device 500) based on the main welding program generated by the main welding program generation unit 23. The robot control unit 25 transmits the generated control signal to the welding robot MC1.

The power supply control unit 26 drives the power supply device 500 based on the main welding program generated by the main welding program generation unit 23 and a calculation result of the calculation unit 24.

The inspection control device 3 controls a processing of the appearance inspection on a welded workpiece produced by a main welding executed by the welding robot MC1 or a repaired and welded workpiece based on the appearance inspection execution command transmitted from the host device 1. The appearance inspection is, for example, to inspect whether a shape of a weld bead formed in a welded workpiece or a repaired and welded workpiece satisfies a predetermined welding standard or a strength standard of a welded portion, or satisfies a quality standard of the welded workpiece or the repaired and welded workpiece. In order to make the following description easy to understand, the inspection control device 3 executes an appearance inspection to inspect whether a weld bead formed in a workpiece Wk (for example, a welded workpiece or a repaired and welded workpiece) satisfies a predetermined welding standard (for example, the shape of the weld bead is the same as or similar to a shape of a predetermined master bead corresponding to the workpiece Wk) based on three dimension (3D) point cloud data indicating the shape of the weld bead acquired by the inspection device 4. Hereinafter, a welded portion determined to be greatly different from the shape of the master bead (that is, not the same as or similar to the shape of the master bead) in the 3D point cloud data indicating a shape of a weld bead is defined as a "detection point". Information indicating a position of the detection point (for example, 3D position coordinates) is detected by the inspection control device 3. The inspection control device 3 includes at least a communication unit 30, a processor 31, a memory 32, and an inspection result storage unit 33.

The communication unit 30 is connected to the host device 1, the robot control device 2, and the inspection device 4 so that data can be communicated among the communication unit 30, the host device 1, the robot control device 2, and the inspection device 4. Although illustration is simplified in FIG. 2, data is transmitted and received between a shape detection control unit 35 and the inspection device 4 via the communication unit 30. The communication unit 30 receives an appearance inspection execution command transmitted from the host device 1. The communication unit 30 transmits a result of an appearance inspection (for example, whether there is a welding defective portion in a welded workpiece or a repaired and welded workpiece) executed by the inspection device 4 to the host device 1.

The processor 31 is configured with, for example, a CPU or an FPGA, and executes various processings and controls in cooperation with the memory 32. Specifically, the processor 31 implements functions of a determination threshold storage unit 34, the shape detection control unit 35, a data processing unit 36, an inspection result determination unit 37, and a repair welding program generation unit 38 by referring to a program stored in the memory 32 and executing the program.

The memory 32 includes, for example, a RAM serving as a work memory used when a processing of the processor 31 is executed, and a ROM that stores a program for defining a processing of the processor 31. The RAM temporarily stores data generated or acquired by the processor 31. A program that defines a processing of the processor 31 is written into the ROM. The memory 32 stores data of an appearance inspection execution command of a welded workpiece transmitted from the host device 1, and data of workpiece information of a welded workpiece produced by a main welding or a repaired and welded workpiece produced by a repair welding. The memory 32 stores the main welding program and the calculation result transmitted from the robot control device 2. The memory 32 also stores data of a repair welding program generated by the repair welding program generation unit 38.

The repair welding program is a program that defines a specific procedure (process) of a repair welding for correcting (repairing) a welding defective portion in a welded workpiece by using a plurality of interpolation points set on a virtual welding line (that is, a virtual welding line welded by executing a main welding based on the main welding program) of a main welding acquired by a main welding simulation based on the main welding program and position information of a corresponding interpolation point (a response point) that is located on the virtual welding line and is closest to the detection point. The repair welding program is generated by the repair welding program generation unit 38 and is transmitted from the inspection control device 3 to the robot control device 2.

The main welding simulation is a simulation executed by the repair welding program generation unit 38 and is used for acquiring a virtual welding line when the main welding is executed based on the main welding program. The virtual welding line acquired by the main welding simulation is acquired as a welding line drawn in a three-dimensional space. Accordingly, even when a welding line is a welding line having a shape that is difficult to be represented by an arc or a linear graphic element, the welding system 100 according to the first embodiment can easily generate the repair program by using the virtual welding line in the generation of a repair welding program for executing a repair welding on defective portion. Since the welding system 100 can execute a simulation including a control signal for driving the welding robot MC1 (specifically, the manipulator 200, the wire feeding device 300, and the power supply device 500) used in accordance with a program, the welding system 100 is highly versatile and useful. Further, the welding system 100 according to the first embodiment can also acquire the virtual welding line based on the generated main welding program in the main welding program for welding a welding line of a free curve in a main welding.

A plurality of interpolation points are set on the virtual welding line acquired by the main welding simulation executed by the repair welding program generation unit 38, and each of the interpolation points is a point for determining a portion to be repaired and welded in a range having a predetermined length when a repair welding is executed on a detection point of a defective portion in the generation of the repair welding program. The interpolation points may be set at a predetermined interval on the virtual welding line, or may be set corresponding to positions of the welding robot MC1 at predetermined time intervals when the virtual welding line is welded. The interpolation points are not limited to being set at a predetermined interval, and may be set based on a line type (a straight line, a curved line, or the like) of the virtual welding line, a curvature of the virtual welding line, or the like. For example, on a virtual welding line divided into a straight section and a curved section having a predetermined curvature, the interpolation points may be set at a smaller interval in the curved section than in the straight section, and may be set at a smaller interval in the curved section as the curvature increases. The interpolation points may be set by a user. Further, the interpolation points may be set at any interval, and, for example, the interpolation points may be set at different intervals in the same straight section. As a result, the welding system 100 according to the first embodiment can easily determine a repaired and welded portion including a response point closer to a detection point in the setting of a corresponding interpolation point (a response point) that is located on a virtual welding line and is closest to a detection point of a defective portion when a repair welding is performed on the detection point of the defective portion. Further, the welding system 100 according to the first embodiment can determine a repaired and welded portion including a response point closer to a detection point by changing an interval between interpolation points set corresponding to a line type.

The inspection result storage unit 33 is configured with, for example, a hard disk drive (HDD) or a solid state drive (SSD). The inspection result storage unit 33 stores data indicating an appearance inspection result of a welded portion of a workpiece Wk (for example, a welded workpiece or a repaired and welded workpiece) as an example of data generated or acquired by the processor 31. The data indicating an appearance inspection result is generated by, for example, the inspection result determination unit 37.

The determination threshold storage unit 34 is configured with, for example, a cache memory provided in the processor 31, and stores a threshold (for example, a threshold set corresponding to a welded portion) used in a determination processing to be executed by the inspection result determination unit 37 corresponding to the welded portion. Examples of the threshold include an allowable range (threshold) related to a positional deviation of a welded portion, a threshold related to a height of a weld bead, and a threshold related to a width of a weld bead. The determination threshold storage unit 34 may store an allowable range that satisfies a minimum welding quality required by a customer or the like (for example, a minimum allowable value, a maximum allowable value, or the like related to a height of a weld bead) as the threshold during an appearance inspection after a repair welding. Further, the determination threshold storage unit 34 may store an upper limit of the number of times of appearance inspections for each welded portion. Accordingly, in a case where the number of times of appearance inspections exceeds a predetermined upper limit of the number of times when a defective portion is corrected by a repair welding, the inspection control device 3 determines that it is difficult or it is less likely to correct the defective portion by an automatic repair welding executed by the welding robot MC1, and can prevent a decrease in an operation rate of the welding system 100.

The shape detection control unit 35 controls an operation of the inspection device 4 based on the shape data (for example, 3D point cloud data) of a weld bead in a welded portion transmitted from the inspection device 4 and an appearance inspection execution command of a welded portion of a workpiece Wk (for example, a welded workpiece or a repaired and welded workpiece) transmitted from the host device 1. When the inspection device 4 is positioned at a position where the inspection device 4 can image a welded portion (in other words, a three-dimensional shape of the welded portion can be detected), the shape detection control unit 35 causes the inspection device 4 to emit, for example, a laser beam to acquire shape data of a weld bead in the welded portion. When the shape detection control unit 35 receives the shape data of the weld bead acquired by the inspection device 4, the shape detection control unit 35 transmits the shape data to the data processing unit 36.

The data processing unit 36 converts the shape data of the weld bead in the welded portion transmitted from the shape detection control unit 35 into image data indicating a three-dimensional shape of the welded portion. The shape data is, for example, point cloud data of shape lines including a reflection trajectory of a laser beam emitted onto a surface of the weld bead. The data processing unit 36 executes a statistical processing on the input shape data, and generates image data related to the three-dimensional shape of the weld bead in the welded portion. In order to emphasize a position and a shape of the weld bead, the data processing unit 36 may execute an edge emphasis correction in which a peripheral edge portion of the weld bead is emphasized. The data processing unit 36 may count the number of times of appearance inspections for each welded portion or defective portion, and determine that it is difficult or it is less likely to correct the defective portion by an automatic repair welding when the number of times of appearance inspections exceeds the number of times stored in advance in the memory 32 and when a welding inspection result is not good. In this case, the inspection result determination unit 37 generates an alert screen including a position of the defective portion and a defect factor, and transmits the generated alert screen to the host device 1 via the communication unit 30. The alert screen transmitted to the host device 1 is displayed on the monitor MN1.

The inspection result determination unit 37 uses the threshold stored in the determination threshold storage unit 34 to determine whether a welded portion satisfies a predetermined welding standard (for example, whether a shape of a weld bead formed by a main welding or a repair welding is the same as or is similar to a shape of a corresponding master bead) based on shape data that is related to a weld bead in a welded portion and is acquired by the shape detection control unit 35. The inspection result determination unit 37 measures a position (see FIGS. 5A and 5B) of a detection point (see the above description) of a welding defect, analyzes defect contents, and estimates a defect factor. In the determination described above, the inspection result determination unit 37 calculates an inspection score for each welded portion on a welding line formed on a weld bead based on shape data of the weld bead. The inspection result determination unit 37 serving as an example of an acquisition unit generates and acquires the measured position of the defective portion, the inspection score, and the estimated defect factor as an appearance inspection result (an appearance inspection report) for a welded portion, stores the generated appearance inspection result in the memory 32, and transmits the appearance inspection result to the host device 1 via the communication unit 30. The inspection result determination unit 37 may determine whether a repair welding can be executed by the welding robot MC1 (in other words, whether it is better to execute a repair welding by the welding robot MC1 or by hand) based on the inspection score described above, and may include a determination result in the appearance inspection result (the appearance inspection report) and output the appearance inspection result.

The repair welding program generation unit 38 has a function of simulating a virtual welding line of a main welding of a welding robot based on a main welding program transmitted from the robot control device 2, and uses the virtual welding line of the main welding, a plurality of interpolation points set on the virtual welding line, an appearance inspection result of the workpiece Wk (for example, a welded workpiece or a repaired and welded workpiece) output from the inspection result determination unit 37, and workpiece information of a welded workpiece or a repaired and welded workpiece (for example, information such as coordinates indicating a position of a detection point of a welding defect of a welded workpiece or a repaired and welded workpiece) to generate a repair welding program for a workpiece Wk (for example, a welded workpiece or a repaired and welded workpiece) to be executed by the welding robot MC1. The details of a procedure for creating the repair welding program will be described later with reference to FIGS. 5A and 5B. The repair welding program may include various parameters such as a welding current, a welding voltage, an offset amount, a welding speed, and a posture of the welding torch 400 for controlling the power supply device 500, the manipulator 200, the wire feeding device 300, the welding torch 400, and the like during the execution of a repair welding. The generated repair welding program may be stored in the processor 31 or in the RAM of the memory 32.

The inspection device 4 is, for example, a three-dimensional shape sensor. The inspection device 4 includes a laser light source (not shown) that can scan a welded portion of a workpiece Wk (for example, a welded workpiece or a repaired and welded workpiece) based on welded portion position information transmitted from the inspection control device 3, and a camera (not shown) that is disposed in a manner of capable of imaging an imaging region including a periphery of the welded portion and that images a reflection trajectory (that is, shape lines of the welded portion) of reflected laser light among laser light emitted onto the welded portion. The inspection device 4 transmits shape data (in other words, image data of a weld bead) of the welded portion based on laser light captured by the camera to the inspection control device 3. The camera described above includes at least a lens (not shown) and an image sensor (not shown). The image sensor is, for example, a solid-state imaging element such as a charge coupled device (CCD) or a complementary metal oxide semiconductor (CMOS), and converts an optical image formed on an imaging surface into an electric signal.

(Operation of Welding System)

Figure 3:
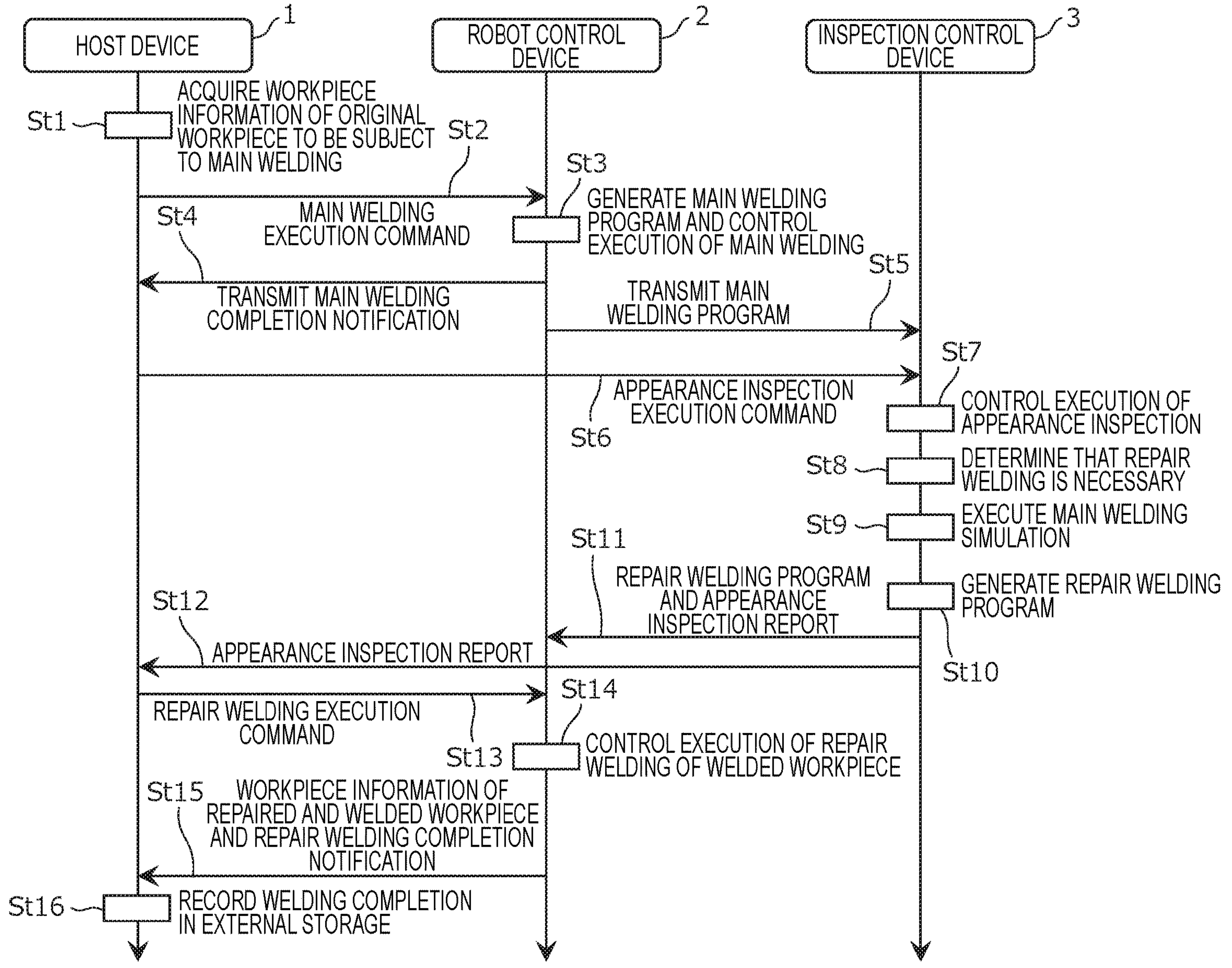
FIG. 3 is a sequence diagram showing an example of an operation procedure of a main welding and a repair welding that are executed by a welding system according to the first embodiment.

Next, an operation procedure of a main welding and a repair welding that are executed by the welding system 100 according to the first embodiment will be described with reference to FIG. 3. FIG. 3 is a sequence diagram showing an example of an operation procedure of a main welding and a repair welding that are executed by the welding system 100 according to the first embodiment. In the description of FIG. 3, an operation procedure executed among the host device 1, the robot control device 2, and the inspection control device 3 for each process of a main welding using a plurality of original workpieces and a repair welding executed based on a fact that an appearance inspection result of a welded workpiece is fail will be described as an example.

In FIG. 3, the host device 1 acquires workpiece information of an original workpiece (for example, an ID, a name, and a welded portion of an original workpiece) to be subjected to a main welding (St1), and generates a main welding execution command including the workpiece information of the original workpiece. The host device 1 transmits the main welding execution command including the workpiece information of the original workpiece to the robot control device 2 (St2).

When the robot control device 2 receives the main welding execution command transmitted from the host device 1, the robot control device 2 uses workpiece information of a plurality of original workpieces included in the main welding execution command to generate a main welding program for a main welding to be executed by the welding robot MC1, and causes the welding robot MC1 to execute the main welding in accordance with the main welding program (St3). When the robot control device 2 determines that the main welding executed by the welding robot MC1 is completed using various known methods, the robot control device 2 generates a main welding completion notification indicating that the main welding is completed and transmits the notification to the host device 1 (St4), and transmits a main welding program used in producing a welded workpiece to the inspection control device 3 (St5). When the host device 1 receives the main welding completion notification, the host device 1 generates an appearance inspection execution command for a welded workpiece, and transmits the appearance inspection execution command to the inspection control device 3 (St6).

The inspection control device 3 causes the inspection device 4 to execute an appearance inspection on a welded workpiece based on the appearance inspection execution command transmitted in step St6 (St7). The inspection control device 3 determines that a repair welding is necessary because there is a welding defective portion in the welded workpiece as a result of the appearance inspection in step St7 (St8), executes a simulation based on the main welding program transmitted from the robot control device 2, and acquires a virtual welding line of the main welding (St9). The inspection control device 3 sets interpolation points at a predetermined interval on the acquired virtual welding line of the main welding, and generates a repair welding program for executing a repair welding on a defective portion including a position of a corresponding interpolation point (a response point) that is located on the welding line and is closest to the detection point (St10). The inspection control device 3 generates an appearance inspection report including the determination result in step St8 and the repair welding program, and transmits the appearance inspection report to the robot control device 2 (St11). The inspection control device 3 transmits the appearance inspection report generated in the same manner to the host device 1 (St12).

When the host device 1 receives the appearance inspection report in step St12, the host device 1 generates a repair welding execution command for a welded workpiece, and transmits the repair welding execution command to the robot control device 2 (St13). When the robot control device 2 receives the repair welding execution command transmitted from the host device 1, the robot control device 2 causes the welding robot MC1 to execute a repair welding in accordance with the repair welding program based on the repair welding program (received in step St12) for the welded workpiece designated by the repair welding execution command (St14). When the robot control device 2 determines that the repair welding executed by the welding robot MC1 is completed using various known methods, the robot control device 2 transmits workpiece information of a repaired and welded workpiece (for example, an ID of a repaired and welded workpiece, workpiece information including respective IDs of a plurality of original workpieces used in a main welding (for example, an ID of an original workpiece, a name, a welded portion of an original workpiece, and welding conditions at the time of executing the main welding and the repair welding)) to the host device 1 (St15).

When the host device 1 receives the workpiece information including the ID of the repaired and welded workpiece transmitted from the robot control device 2, the host device 1 sets a management ID suitable for a user business operator corresponding to the ID of the repaired and welded workpiece, and stores data indicating that welding for the repaired and welded workpiece corresponding to the management ID is completed in the external storage ST (St16).

Next, an operation outline example for specifying a position of an interpolation point (a response point) that is located on an operation trajectory (that is, a welding line) on which the welding robot MC1 is operated during a main welding and is closest to a detection point by using the detection point (that is, a position indicating a welding defective portion) output from the inspection device 4 in the generation of the repair welding program will be described in detail with reference to FIGS. 4 and 5A.

(Operation Outline Example)

Figure 4:
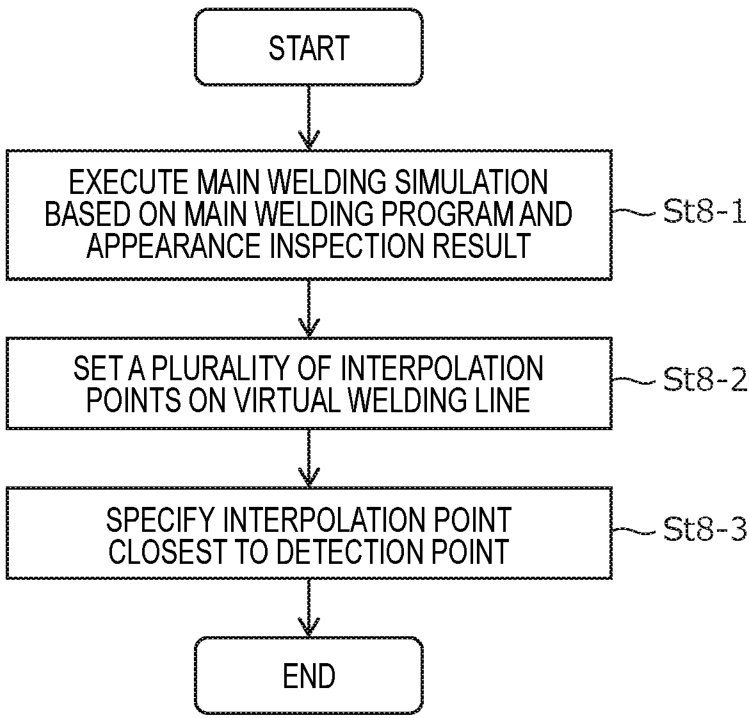
FIG. 4 is a flowchart showing an example of a procedure for specifying an interpolation point that is closest to a detection point.
Figure 5B:
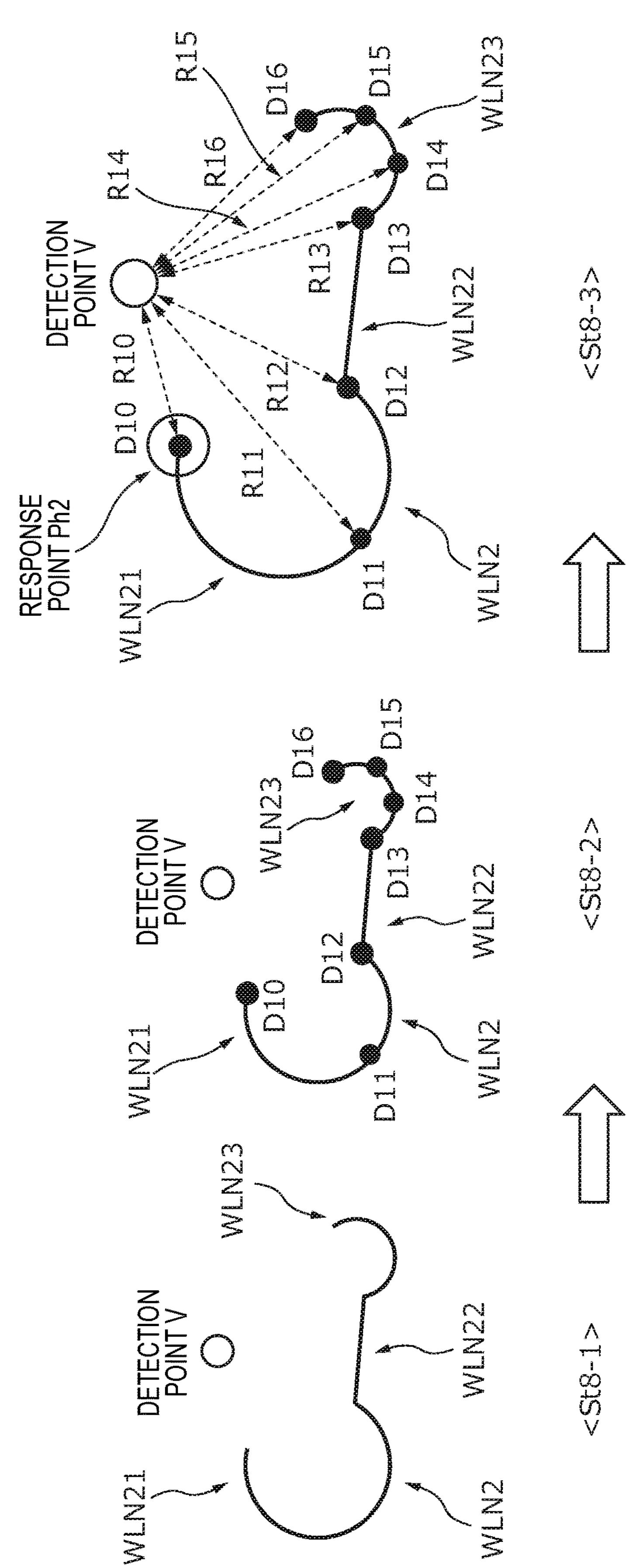
FIG. 5B is a diagram schematically showing an operation outline example related to specification of a response point that is located on a virtual welding line and is closest to a detection point.

FIG. 4 is a flowchart showing an example of a procedure for specifying a response point Ph1 that is closest to a detection point P. FIG. 5A is a diagram schematically showing an operation outline example related to the specification of the response point Ph1 that is located on a virtual welding line WLN1 and is closest to the detection point P. In the first embodiment, processings in the flowchart shown in FIG. 4 are executed by the processor 31 (specifically, the repair welding program generation unit 38) incorporated in the inspection control device 3. In the operation outline example shown in FIGS. 5A and 5B, a welding line includes two straight portions and one arc (curved) portion, and, for example, an undercut (that is, a groove of a toe formed on a base material by a main welding) is generated as a welding defect.

In the operation outline example shown in FIG. 5A, the repair welding program generation unit 38 sets a plurality of interpolation points D1, D2, D3, D4, D5, D6, D7, D8, and D9 at any interval on the virtual welding line WLN1 acquired by executing a main welding simulation based on the main welding program transmitted from the robot control device 2.

In FIG. 4, the repair welding program generation unit 38 acquires the main welding program transmitted from the robot control device 2 and the appearance inspection result generated by the inspection result determination unit 37, and executes a main welding simulation (St8-1). The repair welding program generation unit 38 sets a plurality of interpolation points D1 to D9 at predetermined positions on the virtual welding line WLN1 acquired in step St8-1 (St8-2). The repair welding program specifies an interpolation point (that is, the response point Ph1) on the virtual welding line WLN1 by specifying an interpolation point located a position closest to the detection point P among distances R1, R2, R3, R4, R5, R6, R7, R8, and R9 between respective positions (coordinates) of the plurality of set interpolation points D1 to D9 and a position (coordinates) of the detection point P included in the appearance inspection result (St8-3). In the example shown in FIG. 5A, the interpolation point closest to the detection point P is the interpolation point D8 located at the distance R8 closest to the detection point P. The repair welding program generation unit 38 determines a range having a predetermined length including the response point Ph1 (the interpolation point D8 in FIG. 5A) specified in step St8-3 as a portion to be repaired and welded, and generates a repair welding program in which the portion to be repaired and welded and various parameters (for example, welding conditions) used in a repair welding are defined (St9).

Although FIG. 5A shows an example in which the plurality of interpolation points D1 to D9 are set on one virtual welding line WLN1 to be welded based on a welding program, it is needless to say that the repair welding program generation unit 38 may divide the virtual welding line WLN1 into a straight section and a curved section and set a plurality of interpolation points in each of the divided sections.

An operation outline example of specifying a position of an interpolation point (a response point) on an operation trajectory (that is, a welding line) along which the welding robot MC1 is operated during a main welding in a case where the virtual welding line has a plurality of arcs (curves) having different curvatures will be described in detail with reference to FIGS. 4 and 5B. FIG. 5B is a diagram schematically showing an operation outline example related to the specification of a response point Ph2 that is located on a virtual welding line WLN2 and is closest to a detection point V.

In the operation outline example shown in FIG. 5B, a welding line includes two arc (curved) portions and one straight portion, and, for example, an undercut (that is, a groove of a toe formed on a base material by a main welding) is generated as a welding defect.

In the operation outline example shown in FIG. 5B, the repair welding program generation unit 38 divides the virtual welding line WLN2 acquired by executing a main welding simulation into one straight section WLN22 and a plurality of curved sections WLN21 and WLN23 having different curvatures based on the main welding program transmitted from the robot control device 2, and sets a plurality of interpolation points D10, D11, D12, D13, D14, D15, and D16 at any interval. Here, the repair welding program generation unit 38 compares the curvatures of the plurality of curved sections WLN21 and WLN23 on the virtual welding line WLN2 having different curvatures, and determines that the curvature of the curved section WLN23 is larger than the curvature of the curved section WLN21. The repair welding program generation unit 38 sets more interpolation points in the curved section WLN23 having a larger curvature.

In FIG. 4, the repair welding program generation unit 38 acquires the main welding program transmitted from the robot control device 2 and the appearance inspection result generated by the inspection result determination unit 37, and executes a main welding simulation (St8-1). The repair welding program generation unit 38 sets a plurality of interpolation points D10 to D16 at predetermined positions on the virtual welding line WLN2 acquired in step St8-1 (St8-2). The repair welding program specifies an interpolation point (that is, the response point Ph2) on the virtual welding line WLN2 by specifying an interpolation point closest to the detection point V among distances R10, R11, R12, R13, R14, R15, and R16 between respective positions (coordinates) of the plurality of set interpolation points D10 to D16 and a position (coordinates) of the detection point V included in the appearance inspection result (St8-3). In the example shown in FIG. 5B, the interpolation point closest to the detection point V is the interpolation point D10 located at the distance R10 closest to the detection point V. The repair welding program generation unit 38 determines a range having a predetermined length including the response point Ph2 (the interpolation point D10 in FIG. 5B) specified in step St8-3 as a portion to be repaired and welded, and generates a repair welding program in which the portion to be repaired and welded and various parameters (for example, welding conditions) used in a repair welding are defined (St9).

As described above, in the welding system 100 according to the first embodiment, the repair welding device (for example, the inspection result determination unit 37) acquires an appearance inspection result including position information of a defective portion (for example, the detection point P) of a weld bead of a welded workpiece produced by a main welding executed by the welding robot MC1, sets a plurality of interpolation points on a virtual welding line (for example, the virtual welding line WLN1) that is related to the main welding of the welding robot MC1 and is obtained by a simulation based on a main welding program for executing the main welding, and instructs the welding robot MC1 to execute a repair welding on an interpolation point closest to the position of the acquired defective portion.

As a result, the repair welding device can automatically and more efficiently repair and weld a defective portion of a welded workpiece produced by a main welding. Even when the welding line to be subject to a main welding according to the main welding simulation has a complicated shape such as a free curved line, the repair welding device can automatically acquire the virtual welding line WLN1 by a main welding simulation based on the main welding program, and thus a time required to determine a response point closest to a detection point at which the defective portion is detected can be shortened. Therefore, the repair welding device can automatically and more efficiently repair and weld a defective portion of a welded workpiece produced by a main welding.

The repair welding device generates a repair welding program for executing a repair welding including the position of the interpolation point based on the appearance inspection result, and causes the welding robot to repair and weld the interpolation point according to the generated repair welding program. As a result, the repair welding device can specify an interpolation point that is located on the virtual welding line WLN1 and is closest to the detection point P (that is, on an operation trajectory along which the welding robot MC1 is operated during a main welding) among a plurality of interpolation points set on the virtual welding line WLN1, and can automatically and more efficiently execute a repair welding via the welding robot MC1 in a manner of including the position of the interpolation point.

The repair welding device sets the plurality of interpolation points on the virtual welding line WLN1 corresponding to a position of the welding robot at each predetermined time. As a result, the repair welding device can more efficiently generate a repair welding program for repairing a welded portion in a predetermined range including a position (coordinates) corresponding to a position (coordinates) of the welding robot MC1 at a predetermined time on an operation trajectory along which the welding robot MC1 is operated during a main welding.

When a virtual welding line includes a straight section and a curved section, the repair welding device sets an interval between a plurality of interpolation points in the curved section to be smaller than an interval between a plurality of interpolation points in the straight section. As a result, the repair welding device can easily set a plurality of interpolation points on the virtual welding line WLN1 corresponding to the straight section and the curved section, can specify an interpolation point that is located on the virtual welding line WLN1 and is closest to the detection point P (that is, on the operation trajectory along which the welding robot MC1 is operated during a main welding) among the interpolation points, and can automatically and more efficiently execute a repair welding via the welding robot MC1 in a manner of including the position of the interpolation point.

When the virtual welding line WLN1 has one or more straight sections and one or more curved sections, the repair welding device sets an interval between a plurality of interpolation points in the curved section to be smaller than an interval between a plurality of interpolation points in the straight section. As a result, the repair welding device can reduce a variation in a position of a response point that is close to a detection point on the virtual welding line WLN1, and can set an interpolation point capable of specifying a more accurate response point.

When the virtual welding line has two or more curved sections having different curvatures, the repair welding device sets an interval between a plurality of interpolation points in a curved section having a large curvature to be smaller than an interval between a plurality of interpolation points in a curved section having a small curvature. As a result, the repair welding device can reduce a variation in a position of a response point that is close to a detection point in a section having a larger curvature (for example, the curved section WLN23 in FIG. 5B) on the virtual welding line WLN2, and can set an interpolation point capable of specifying a more accurate response point.

Second Embodiment

In the first embodiment, the repair welding program is generated by the inspection control device 3. In the second embodiment, an example in which the repair welding program is executed by a robot control device 2*a* will be described.

(Configuration of Welding System)

Figure 6:
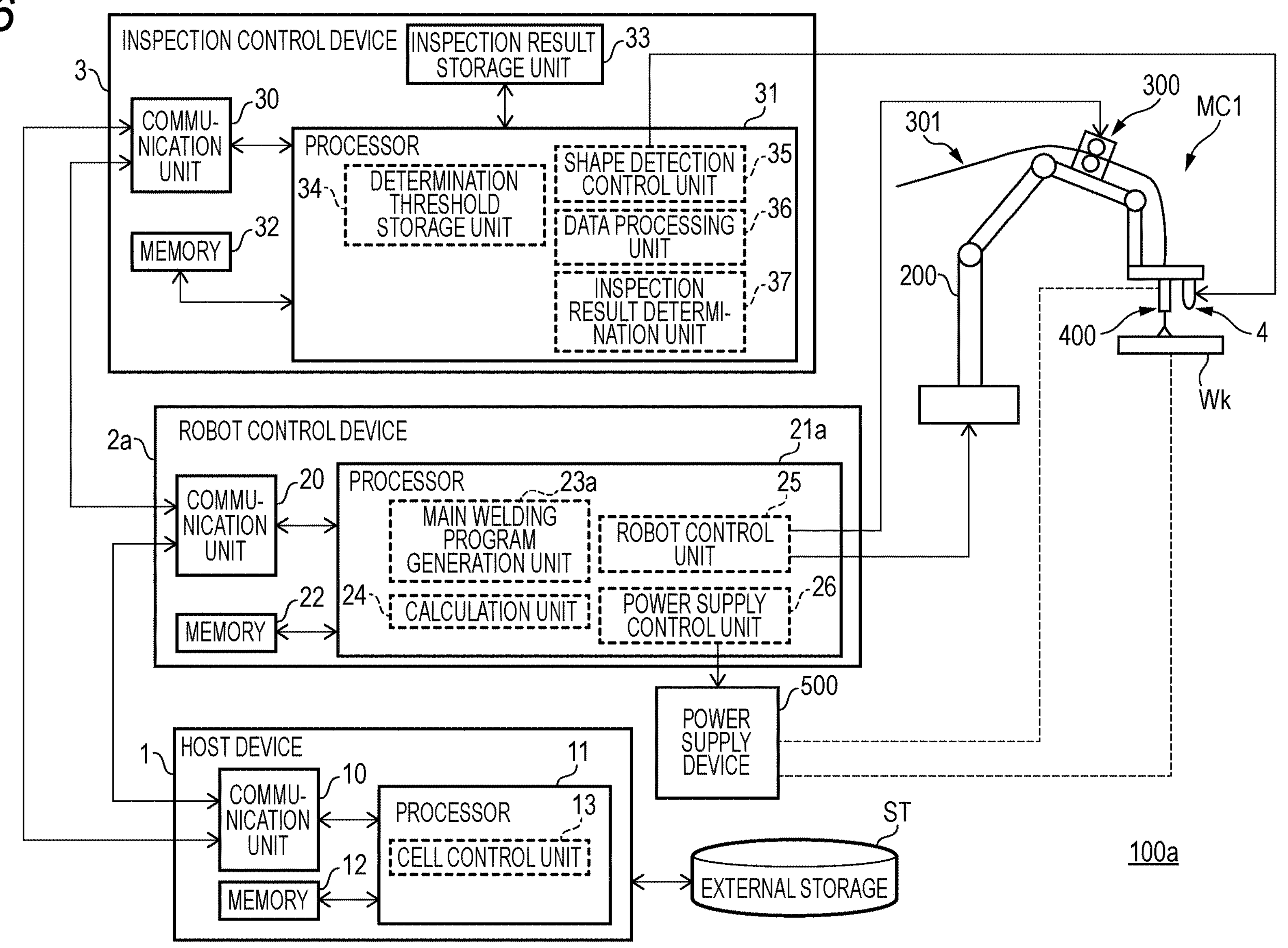
FIG. 6 is a diagram showing an internal configuration example of an inspection control device, a robot control device, and a host device according to a second embodiment.

FIG. 6 is a diagram showing an internal configuration example of the inspection control device 3, the robot control device 2*a*, and the host device 1 according to the second embodiment. In the description of FIG. 6, the same components as those shown in FIG. 2 are denoted by the same reference numerals, description thereof will be simplified or omitted, and different contents will be described. The configuration of a welding system 100*a* according to the second embodiment is the same as the configuration of the welding system 100 according to the first embodiment (see FIG. 1).

The robot control device 2*a* serving as an example of a repair welding device controls a processing of the corresponding welding robot MC1 (specifically, the manipulator 200, the wire feeding device 300, and the power supply device 500) based on a main welding execution command or a repair welding execution command transmitted from the host device 1. The robot control device 2*a* includes at least the communication unit 20, a processor 21*a*, and the memory 22.

The processor 21*a* is configured with, for example, a CPU or an FPGA, and executes various processings and controls in cooperation with the memory 22. Specifically, the processor 21*a* implements functions of a main welding or repair welding program generation unit 23*a*, the calculation unit 24, the robot control unit 25, and the power supply control unit 26 by referring to a program stored in the memory 22 and executing the program.

The main welding or repair welding program generation unit 23*a* uses workpiece information (for example, an ID, a name, and a welded portion of an original workpiece) of each of a plurality of original workpieces included in a main welding execution command transmitted from the host device 1 via the communication unit 20 to generate a main welding program for a main welding to be executed by the welding robot MC1 based on the main welding execution command. When it is determined that a repair welding is necessary as a result of the appearance inspection of the workpiece Wk (for example, a welded workpiece or a repaired and welded workpiece) executed by the inspection result determination unit 37, the main welding or repair welding program generation unit 23*a* executes a main welding simulation based on the generated main welding program and acquires a virtual welding line. The main welding or repair welding program generation unit 23*a* generates a repair welding program for a workpiece Wk (for example, a welded workpiece or a repaired and welded workpiece) that includes an interpolation point closest to a detection point of a defective portion in a welded portion and that is to be executed by the welding robot MC1, by using the virtual welding line acquired by the main welding simulation, the appearance inspection result of the workpiece Wk (for example, a welded workpiece or a repaired and welded workpiece) output from the inspection result determination unit 37, and workpiece information of a welded workpiece or a repaired and welded workpiece (for example, information such as coordinates indicating a position of a detection point of a welding defect of a welded workpiece or a repaired and welded workpiece). Details of a procedure for creating the repair welding program are the same as those described in the first embodiment with reference to FIGS. 4 and 5A, and thus description thereof will be omitted. The generated main welding program and repair welding program may be stored in the processor 21*a* or may be stored in the RAM of the memory 22.

(Operation of Welding System)

Figure 7:
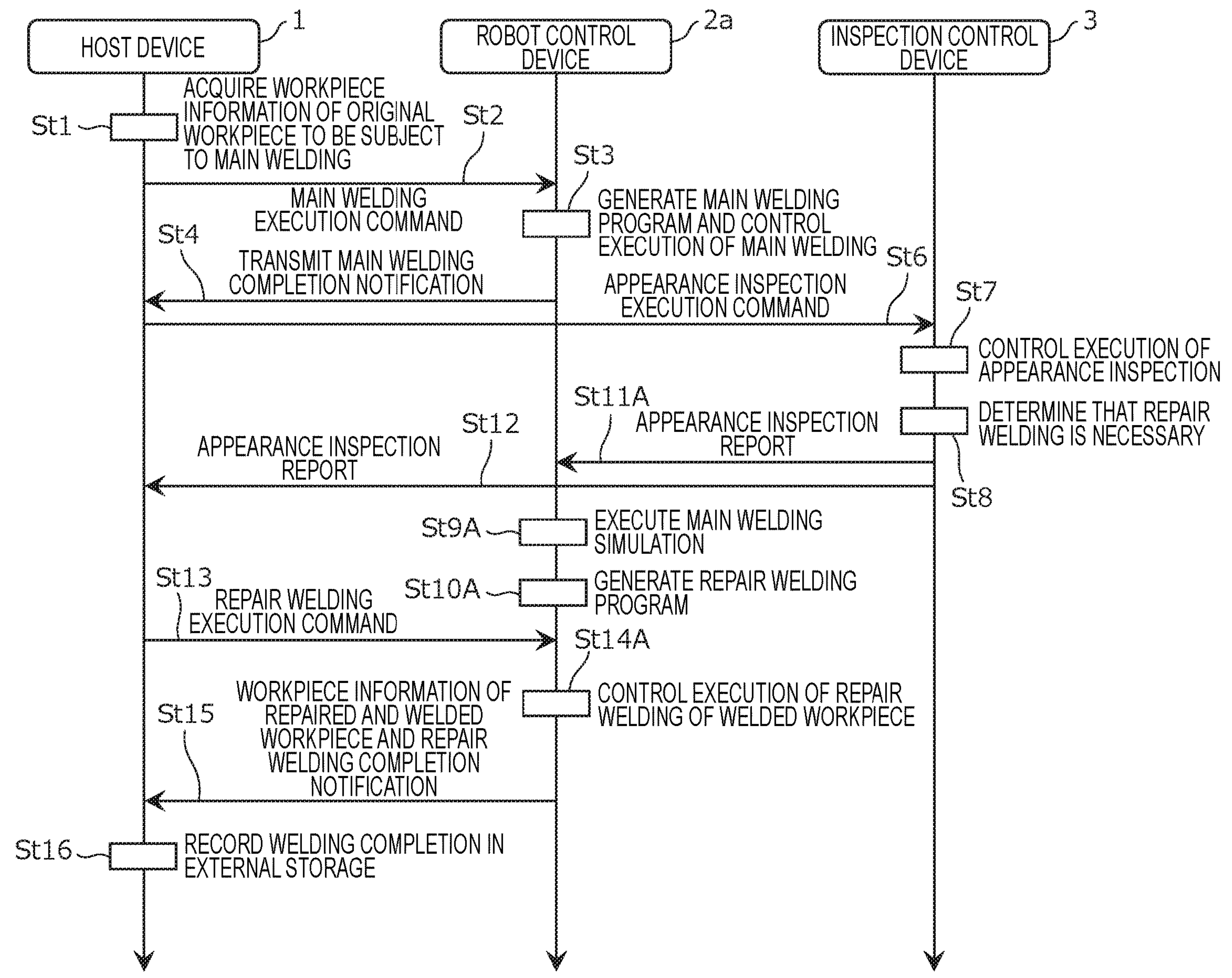
FIG. 7 is a sequence diagram showing an example of an operation procedure of a main welding and a repair welding that are executed by a welding system according to the second embodiment.

Next, an operation procedure of a main welding and a repair welding that are executed by the welding system 100*a* according to the second embodiment will be described with reference to FIG. 7. FIG. 7 is a sequence diagram showing an operation procedure example of a main welding and a repair welding that are executed by the welding system 100*a* according to the second embodiment. In the description of FIG. 7, an operation procedure executed among the host device 1, the robot control device 2*a*, and the inspection control device 3 for each process of a main welding using a plurality of original workpieces and a repair welding executed based on a fact that an appearance inspection result of a welded workpiece is fail will be described as an example. In the description of FIG. 7, the same step numbers are given to the same processes as those in FIG. 3, description thereof will be simplified or omitted, and different contents will be described.

In FIG. 7, when the robot control device 2*a* determines that the main welding executed by the welding robot MC1 is completed using various known methods, the robot control device 2*a* generates a main welding completion notification indicating that the main welding is completed and transmits the notification to the host device 1 (St4). When the host device 1 receives the main welding completion notification, the host device 1 generates an appearance inspection execution command for a welded workpiece, and transmits the appearance inspection execution command to the inspection control device 3 (St6).

The inspection control device 3 causes the inspection device 4 to execute an appearance inspection on a welded workpiece based on the appearance inspection execution command transmitted in step St6 (St7). The inspection control device 3 determines that a repair welding is necessary because there is a welding defective portion in the welded workpiece as a result of the appearance inspection in step St7 (St8). The inspection control device 3 generates an appearance inspection report including the determination result in step St8, and transmits the appearance inspection report to the robot control device 2*a* (St11A). The inspection control device 3 transmits the appearance inspection report generated in the same manner to the host device 1 (St12).

The robot control device 2*a* executes the main welding simulation based on the appearance inspection report transmitted from the inspection control device 3 and the main welding program generated in step St3, and acquires a virtual welding line of the main welding (St9A). The inspection control device 3 sets interpolation points at a predetermined interval on the acquired virtual welding line of the main welding, and generates a repair welding program for executing a repair welding on a defective portion including a position of a corresponding interpolation point (a response point) that is located on the welding line and is closest to a detection point (St10A).

When the host device 1 receives the appearance inspection report in step St12, the host device 1 generates a repair welding execution command for a welded workpiece, and transmits the repair welding execution command to the robot control device 2*a* (St13). When the robot control device 2*a* receives the repair welding execution command transmitted from the host device 1, the robot control device 2*a* causes the welding robot MC1 to execute a repair welding in accordance with the repair welding program based on the repair welding program for the welded workpiece designated by the repair welding execution command (St14A). Processings after step St15 are the same as those in FIG. 3, and thus description thereof will be omitted.

As described above, in the welding system 100*a* according to the second embodiment, the robot control device 2*a* generates a repair welding program for executing a repair welding on an interpolation point (a response point) that is located on the virtual welding line WLN1 and is closest to the position of the detection point P among a plurality of interpolation points, based on the appearance inspection result. The repair welding device (for example, the robot control device 2*a*) causes the welding robot MC1 to repair and weld the interpolation point in accordance with the generated repair welding program. As a result, the repair welding device can specify the position of the interpolation point that is located on an operation trajectory of the welding robot MC1 during a main welding and is closest to the detection point P acquired in the appearance inspection, and can automatically and more efficiently execute a repair welding via the welding robot MC1 in a manner of including the position of the interpolation point.

Third Embodiment

In the second embodiment, the repair welding program is generated by the robot control device 2*a*. In the third embodiment, an example in which the repair welding program is executed by a host device 1*a* will be described.

(Configuration of Welding System)

FIG. 8 is a diagram showing an internal configuration example of the inspection control device 3, the robot control device 2, and the host device 1*a* according to the third embodiment. In the description of FIG. 8, the same components as those shown in FIG. 2 are denoted by the same reference numerals, description thereof will be simplified or omitted, and different contents will be described. The configuration of a welding system 100*b* according to the third embodiment is the same as the configuration of the welding system 100 according to the first embodiment (see FIG. 1).

The host device 1*a* serving as an example of a repair welding device integrally controls, via the robot control device 2, the execution of a repair welding (for example, start and completion of the repair welding) executed by the welding robot MC1. For example, when the host device 1*a* receives the appearance inspection report from the inspection control device 3, the host device 1*a* generates a repair welding program, generates a repair welding execution command for a welded workpiece produced by the welding robot MC1, and transmits the repair welding program to the robot control device 2. The host device 1*a* includes at least the communication unit 10, a processor 11*a*, and the memory 12.

The processor 11*a* is configured with, for example, a CPU or an FPGA, and executes various processings and controls in cooperation with the memory 12. Specifically, the processor 11*a* implements functions of the cell control unit 13 and the repair welding program generation unit 14 by referring to a program stored in the memory 12 and executing the program.

When it is determined that a repair welding is necessary as a result of the appearance inspection of the workpiece Wk (for example, a welded workpiece or a repaired and welded workpiece) transmitted from the inspection control device 3, the repair welding program generation unit 14 executes a main welding simulation based on the main welding program transmitted from the robot control device 2 and acquires a virtual welding line. The repair welding program generation unit 14 generates a repair welding program for a workpiece Wk (for example, a welded workpiece or a repaired and welded workpiece) to be executed by the welding robot MC1 by using the acquired virtual welding line, the appearance inspection result of the workpiece Wk (for example, a welded workpiece or a repaired and welded workpiece) transmitted from the inspection control device 3, and workpiece information of a welded workpiece or a repaired and welded workpiece (for example, information such as coordinates indicating a position of a detection point of a welding defect of a welded workpiece or a repaired and welded workpiece). Details of a procedure for creating the repair welding program are the same as those described in the first embodiment with reference to FIGS. 4 and 5A, and thus description thereof will be omitted. The generated repair welding program may be stored in the processor 11*a* or in the RAM of the memory 12.

(Operation of Welding System)

Next, an operation procedure of a main welding and a repair welding that are executed by the welding system 100*b* according to the third embodiment will be described with reference to FIG. 9. FIG. 9 is a sequence diagram showing an operation procedure example of a main welding and a repair welding that are executed by the welding system 100*b* according to the third embodiment. In the description of FIG. 9, an operation procedure executed among the host device 1*a*, the robot control device 2, and the inspection control device 3 for each process of a main welding using a plurality of original workpieces and a repair welding executed based on a fact that an appearance inspection result of a welded workpiece is fail will be described as an example. In the description of FIG. 9, the same step numbers are given to the same processes as those in FIG. 3, description thereof will be simplified or omitted, and different contents will be described.

In FIG. 9, when the robot control device 2 determines that the main welding executed by the welding robot MC1 is completed using various known methods, the robot control device 2 generates a main welding completion notification indicating that the main welding is completed and transmits the notification to the host device 1*a* (St4), and transmits a main welding program used in producing a welded workpiece to the host device 1*a* (St5B). When the host device 1*a* receives the main welding completion notification, the host device 1*a* generates an appearance inspection execution command for a welded workpiece, and transmits the appearance inspection execution command to the inspection control device 3 (St6).

The inspection control device 3 causes the inspection device 4 to execute an appearance inspection on a welded workpiece based on the appearance inspection execution command transmitted in step St6 (St7). The inspection control device 3 determines that a repair welding is necessary because there is a welding defective portion in the welded workpiece as a result of the appearance inspection in step St7 (St8). The inspection control device 3 generates an appearance inspection report including the determination result in step St8, and transmits the appearance inspection report to the robot control device 2 (St11B). The inspection control device 3 transmits the appearance inspection report generated in the same manner to the host device 1*a* (St12).

The host device 1*a* executes the main welding simulation based on the appearance inspection report transmitted from the inspection control device 3 and the main welding program transmitted from the robot control device 2, and acquires a virtual welding line of the main welding (St9B). The inspection control device 3 sets interpolation points at a predetermined interval on the acquired virtual welding line of the main welding, and generates a repair welding program for executing a repair welding on a defective portion including a position of a corresponding interpolation point (a response point) that is located on the welding line and is closest to a detection point (St10B).

When the host device 1*a* receives the appearance inspection report in step St12, the host device 1*a* generates a repair welding execution command for a welded workpiece, and transmits a repair welding program and the generated repair welding execution command to the robot control device 2 (St13B). When the robot control device 2 receives the repair welding program and the repair welding execution command transmitted from the host device 1*a*, the robot control device 2*a* causes the welding robot MC1 to execute a repair welding in accordance with the repair welding program based on the repair welding program for the welded workpiece designated by the repair welding execution command (St14B). Processings after step St15 are the same as those in FIG. 3, and thus description thereof will be omitted.

As described above, in the welding system 100*b* according to the third embodiment, the host device 1*a* generates a repair welding program for executing a repair welding on an interpolation point (a response point) that is located on the virtual welding line WLN1 and is closest to the position of the detection point P among a plurality of interpolation points, based on the appearance inspection result. The repair welding device (for example, the host device 1*a*) causes the welding robot MC1 to repair and weld the interpolation point (a response point) in accordance with the generated repair welding program. As a result, the repair welding device can specify the position of the interpolation point that is located on an operation trajectory of the welding robot MC1 during a main welding and is closest to the detection point P acquired in the appearance inspection, and can automatically and more efficiently execute a repair welding via the welding robot MC1 in a manner of including the position of the interpolation point.

Although various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Components in various embodiments described above may be combined freely in a range without deviating from the spirit of the invention.

The present disclosure is useful as a repair welding device and a repair welding method for automatically and more efficiently executing a repair welding on a defective portion of a welded workpiece produced by a main welding.

What is claimed is:

1. A repair welding device comprising:

an acquisition unit configured to acquire an appearance inspection result including information about a position of a defective portion of a weld bead of a welded workpiece produced by a main welding that is executed by a welding robot; and a robot control unit configured to set a plurality of interpolation points on a virtual welding line of the main welding executed by the welding robot, and instruct the welding robot to execute a repair welding on an interpolation point that is closest to the acquired position of the defective portion, the virtual welding line being simulated based on a main welding program for executing the main welding, wherein the position of the defective portion is free from overlap with the virtual welding line.

2. The repair welding device according to claim 1, further comprising:

a repair welding program generation unit that generates a repair welding program for executing the repair welding including a position of the interpolation point based on the appearance inspection result, wherein the robot control unit causes the welding robot to execute the repair welding on the interpolation point in accordance with the repair welding program.

3. The repair welding device according to claim 1, wherein each of the plurality of interpolation points is set on the virtual welding line corresponding to a position of the welding robot at each predetermined time.

4. The repair welding device according to claim 1, wherein the plurality of interpolation points are respectively set on the virtual welding line at a predetermined interval.

5. The repair welding device according to claim 1, wherein in a case that the virtual welding line has one or more straight sections and one or more curved sections, an interval between the interpolation points in the curved section is set to be smaller than an interval between the interpolation points in the straight section.

6. The repair welding device according to claim 1, wherein in a case that the virtual welding line has two or more curved sections having different curvatures, an interval between the interpolation points in one of the curved sections having a large curvature is set to be smaller than an interval between the interpolation points in another of the curved sections having a small curvature.

7. A repair welding method to be executed by a repair welding device, the repair welding method comprising:

a process of acquiring an appearance inspection result including information about a position of a defective portion of a weld bead of a welded workpiece produced by a main welding that is executed by a welding robot;

a process of setting a plurality of interpolation points on a virtual welding line of the main welding executed by the welding robot, the virtual welding line being simulated based on a main welding program for executing the main welding; and a process of instructing the welding robot to execute a repair welding on an interpolation point that is closest to the acquired position of the defective portion, wherein the position of the defective portion is free from overlap with the virtual welding line.

* * * * *